(12) United States Patent
Saito

(10) Patent No.: US 8,490,209 B2
(45) Date of Patent: Jul. 16, 2013

(54) SURFACE STATE MEASURING DEVICE, AND SURFACE STATE MEASURING METHOD USING THE DEVICE

(75) Inventor: Hitoshi Saito, Akita (JP)

(73) Assignee: Akita University, Akita-shi (JP)

( * ) Notice: Subject to any disclaimer, the term of this patent is extended or adjusted under 35 U.S.C. 154(b) by 187 days.

(21) Appl. No.: 12/852,635

(22) Filed: Aug. 9, 2010

(65) Prior Publication Data

US 2011/0030109 A1 Feb. 3, 2011

Related U.S. Application Data

(63) Continuation-in-part of application No. PCT/JP2009/052338, filed on Feb. 12, 2009.

(30) Foreign Application Priority Data

Feb. 12, 2008 (JP) ................................. 2008-031128
Sep. 9, 2008 (JP) ................................. 2008-231530

(51) Int. Cl.
*G01Q 20/00* (2010.01)

(52) U.S. Cl.
USPC ..................... 850/5; 850/12; 850/19; 850/52

(58) Field of Classification Search
USPC ................ 850/1, 2, 3, 5, 6, 7, 12, 13, 19, 20, 850/26, 29, 33, 37, 38, 39, 52, 46, 47, 48, 850/49; 73/104, 105
See application file for complete search history.

(56) References Cited

U.S. PATENT DOCUMENTS

| 5,907,096 A * | 5/1999 | Chen ............................... 73/105 |
| 2001/0038282 A1 * | 11/2001 | Abe ............................... 324/210 |
| 2007/0272005 A1 * | 11/2007 | Abe et al. ........................ 73/105 |

FOREIGN PATENT DOCUMENTS

| JP | 5-142315 A | 6/1993 |
| JP | 8-122341 A | 5/1996 |
| JP | 10-334525 A | 12/1998 |
| JP | 2001-272327 A | 10/2001 |
| JP | 2002-286613 A | 10/2002 |
| JP | 2003-065935 A | 3/2003 |
| JP | 2004-294218 A | 10/2004 |

OTHER PUBLICATIONS

M.R. Koblischka, et al; "Observation of Stray Fields From Hard-Disk Writer Poles up to 2 GHz", IEEE Transactions on Magnetics, vol. 43, No. 6, Jun. 2007 (no exact date found), pp. 2205-2207.
Masayuki Abe, et al; "A Study of High-Frequency Characteristics of Write Heads With the AC-Phase High-Frequency Magnetic Force Microscope", IEEE Transactions on Magnetics, vol. 38, No. 1, Jan. 2002 (no exact date found), pp. 45-49.
International Search Report: PCT/JP2009/052338.

\* cited by examiner

*Primary Examiner* — Nicole Ippolito
(74) *Attorney, Agent, or Firm* — Ladas & Parry LLP

(57) ABSTRACT

Provided are a surface state measuring device which can measure an alternating force of an arbitrary frequency and which is excellent in spatial resolution, and a surface state measuring method using the device. This surface state measuring device measures the surface state of a sample by detecting the modulation of the oscillation of a probe arranged above the sample. The measuring device comprises: a cantilever having a probe near a free end; an excitation mechanism for exciting the cantilever; a scanning mechanism for making the probe scan the sample by moving the probe and the sample relative to each other; and alternating force generator for generating an alternating force of an arbitrary frequency in a space; and a modulation measuring mechanism for measuring the degree of frequency modulation or amplitude modulation of the oscillations of the probe, which are generated by the alternating force.

10 Claims, 13 Drawing Sheets

0.5 μm

Fig. 10
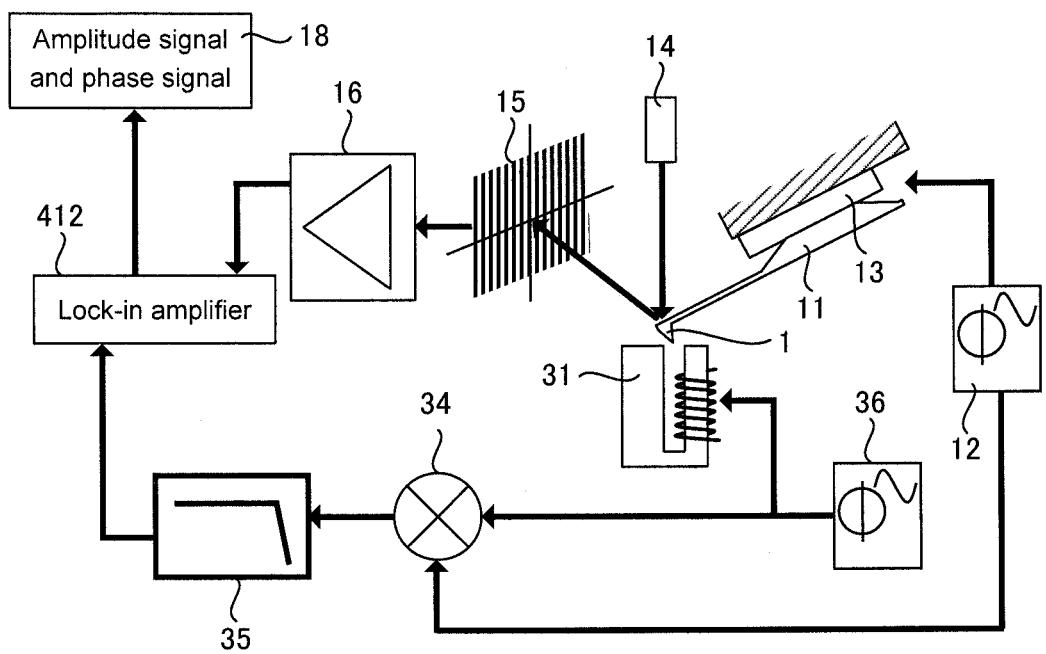
Fig. 11A  Fig. 11B  Fig. 11C
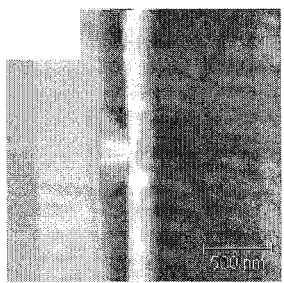
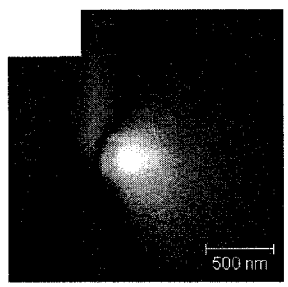
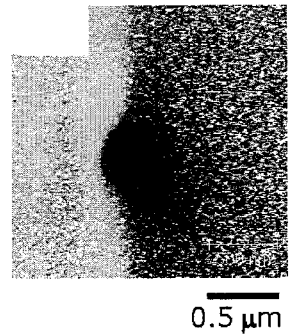
0.5 μm

SURFACE STATE MEASURING DEVICE, AND SURFACE STATE MEASURING METHOD USING THE DEVICE

TECHNICAL FIELD

The present invention relates to a surface state measuring device for obtaining microscopic surface information of test sample by bringing a probe into the proximity of a sample and scanning the sample, and relates to a surface state measuring method using the device. Particularly, the invention relates to a surface state measuring device which can obtain image information about responsive spatial distribution according to the alternating magnetic field or alternating electric field of the magnetic material sample or dielectric sample at the same time as obtaining image information about the shape of the sample surface, and a surface state measuring method using the device.

BACKGROUND ART

Examples of device which can obtain microscopic surface information of a sample by bringing a probe into proximity of the sample may be scanning probe microscope. Known examples of conventional scanning probe microscope include: an atomic force microscope (hereinafter, referred to as "AFM".) which detects the interaction force between the sample and the probe by using a cantilever; and a magnetic force microscope (hereinafter, referred to as "MFM".) wherein a magnetic material is used as a probe of an atomic force microscope (see, for example, Patent documents 1 and 2).

In these scanning probe microscopes, it is the so-called "AC mode" to measure force gradient of such as electric forces, magnetic forces, and van der Waals forces caused by bringing the probe, which is provided at a proximity of the free end, into the proximity of the sample when a piezoelectric element for exciting cantilever and the like are excited by alternating voltage. When the cantilever is excited with a predetermined oscillation frequency, it is as if spring constant of the cantilever is changed by the force gradient of the sample. So, in the AC mode, by using the above property, fluctuation of the resonance characteristic of the cantilever is detected to measure the shape of sample's surface, electric forces, and magnetic forces. In other words, if an effective spring constant of the cantilever changes, resonance frequencies of the cantilever also changes; if the cantilever is excited at a oscillation frequency, oscillation amplitude and phase of the cantilever (probe) change.

In the AFM which adopts AC mode, the probe is formed at a tip of cantilever of which spring constant is 0.01 N/m to dozens of Newton per meter and of which resonance frequencies is several to several hundreds of kilohertz. The cantilever is fixed to an excitation actuator comprising a piezoelectric element and arranged so that the cantilever faces a sample surface supported on a fine-motion element, namely xy-plane. When the probe and sample relatively move, the probe scans the sample surface.

During the scanning, driving voltage which enables to oscillate the probe with a predetermined amplitude in a perpendicular direction to the sample surface is applied to the excitation actuator with a frequency near the resonance frequencies of the cantilever. The fine-motion element comprising the piezoelectric element to support the sample is controlled at an accuracy of 0.1 nm or less so that the oscillation amplitude of the probe is constant; and the sample is relatively moved in the perpendicular direction to the sample surface, namely z-direction. Consequently, the tip of the probe traces on a curved surface which reflects the surface shape of the sample.

Therefore, when the position of the tip of the probe on the xy-plane and the position of the same in the z-direction is obtained by applying the voltage to the fine-motion element and recording it, it is possible to obtain an AFM image showing fine recess and protrusion of the sample surface.

At this time, when using a magnetic materials (for example, CoCr, FrPt, and permalloy) as the probe and using a magnetic device (for example, magnetic tape, hard disk media, magnetic head, and magneto-optical disk media) as the sample, the force gradient which affects the image of AFM is not only short-range forces which work at the vicinity of the sample surface, for example, van der Waals forces, but also magnetic force as a long-range force.

Accordingly, when the distance between the probe and the sample is short, image of the topography of the sample surface is mainly observed; when the distance between the probe and the sample is long, image of the magnetic force is mainly observed. The distance between the probe and the sample during scanning can be adjusted by keeping decreasing rate of the oscillation amplitude constant. For instant, when the cantilever is excited at a frequency slightly higher than the resonance frequencies of the cantilever, if the probe is brought into proximity of the sample, resonance frequencies of the cantilever decreases because of the attracting force between the probe and the sample, thereby oscillation amplitude of the cantilever which is excited at a constant excitation frequency decreases. Hence, when the decreasing rate increases, the probe moves closer towards the sample. The obtained image is the image with constant force gradient. As it were, the image with constant force gradient, which is obtained by measuring in a manner that decreasing rate of oscillation amplitude of the cantilever is constant under a condition where the distance between the probe and the sample is short, is a profile of surface topography.

On the other hand, the image of constant force gradient, which is obtained by measuring in a manner that decreasing rate of oscillation amplitude of the cantilever is constant under a condition where the distance between the probe and the sample is long, is an image with constant magnetic force gradient. However, since the distance between the probe and the sample is not constant, the image includes not only magnetic information but also information of surface topography. When evaluating the magnetic recording media and so on, surface topography and magnetic field information have not been separated.

A method is proposed to measure magnetic force gradient under a condition that distance between the probe and the sample is constant, the method comprises the steps of: during scanning with the probe, firstly, intermittently bringing the probe into contact with the sample under a condition that decreasing rate of the oscillation amplitude of the cantilever is large and measuring the surface topography of a sample along a scanning line; then, making the probe apart from a sample surface with a certain height (probe-sample distance) so that the magnetic force works as the main force from the sample at the same location in xy-plane, oscillating the cantilever and recording the oscillation amplitude or phase. When employing the method, it is possible to obtain a magnetic force image at the same position as the profile of surface topography. Therefore, with magnetic recording media and so on, it is also possible to know the effect of thin-film texture related to the surface topography on the magnetic domain structure.

In recent years, with high-density magnetic recording, to evaluate microscopic magnetic domain structure of the recording media, improvement of spatial resolution of MFM has been required. Moreover, with faster speed of the magnetic storage devices, it is important to evaluate frequency property of the high-frequency magnetic field generated from the magnetic device and high-frequency response of the soft magnetic materials used for magnetic devices. To improve the spatial resolution of MFM, it is necessary to improve detection sensitivity of the force gradient; it can be effectively attained by improving mechanical resonance characteristic of the cantilever. The resonance characteristic of the cantilever depends on measurement atmosphere. In a vacuum atmosphere that air viscosity is small, compared with air atmosphere, the resonance characteristics enhances significantly.

The resonance characteristic can be evaluated by a value of performance factor "Q" of resonance. By the resonance, the detection sensitivity increases about Q-fold. The Q-value under an air atmosphere is several hundred; however Q-value under a vacuum atmosphere increases up to several thousand to several million. Therefore, by exciting cantilever near the resonance frequencies having a large Q-value with an excitation actuator comprising piezoelectric element, spatial resolution can be improved. With respect to the measurement of high-frequency magnetic field by using MFM, frequency component of the high-frequency magnetic field needs to include the value near the resonance frequencies ($f_0$) of the cantilever or high-order component of the resonance frequencies ($n \times f_0$: n is a positive integer). Examples measured in the past may be an alternating magnetic field of a single frequency near the resonance frequencies of the cantilever and an alternating magnetic field which has a resonance frequencies component of the probe and of which amplitude is modulated. Conventionally, measurement of these specified frequencies, except for those in the alternating magnetic field, has been difficult (see Non-Patent Document 1.).

Patent Document 1: Japanese Patent Application Laid-Open (JP-A) No. 08-122341

Patent Document 2: JP-A No. 2003-065935

Non-Patent Document 1: Wei. J.-D, and three others, "Observation of stray fields from hard-disk writer poles up 2 GHz", IEEE Transactions on Magnetics, June 2007, Vol. 43, No. 6, pp. 2205-2207.

Non-Patent Document 2: Masayuki ABE, Yoichiro TANAKA, "A Study of High-Frequency Characteristics of Write Heads With the AC-Phase High-Frequency Magnetic Force Microscope", IEEE Transactions on Magnetics, January 2002, Vol. 38, pp. 45-49.

DISCLOSURE OF THE INVENTION

Problems to be Solved by the Invention

When the Q-value is raised so as to improve the sensitivity, oscillation of the cantilever occurs only near the resonance frequencies. So, in the AC mode which excites the cantilever at a constant oscillation frequency, due to the slight change of force gradient that probe gets near the resonance frequencies, oscillation amplitude and phase of the probe change significantly. Here, a method to detect an amplitude is called "amplitude detecting method", and a method to detect a phase is called "phase detecting method". By raising Q-value in this way, it is possible to measure a force gradient with high sensitivity.

However, by the increase of Q-value, transient phenomenon which takes time until the probe comes to oscillate within a steady oscillation determined by the force gradient at the measurement point becomes significant, so the time response is lowered. Therefore, in the AC mode, when the Q-value is 10000 or more, high sensitivity and fast time response is not compatible. In other words, although oscillation amplitude largely changes due to the slight change of probe-sample distance, the time response is deteriorated. Thereby, it becomes difficult to obtain a profile of surface topography measured by controlling the oscillation amplitude of the cantilever to be constant.

In order to solve the problem, a method for detecting frequency comprising the steps of: detecting resonance frequencies of the cantilever, making an excitation frequency of the cantilever follow the set resonance frequencies, and controlling the probe-sample distance, was proposed. By the method allowing the probe to scan with constant resonance frequencies, an image of constant force gradient can be obtained.

Because of this, even in the case where the Q-value is 10000 or more, an image can be obtained. When applying the method to the magnetic force measurement, the image of constant magnetic force gradient can be observed with high sensitivity. However, when making the set value of the resonance frequencies of the cantilever meet the probe-sample distance which can detect the magnetic field, only an image of magnetic field which is mixed with a profile of surface topography can be obtained. When the probe-sample distance is constant, it is difficult to obtain an image of magnetic field and a profile of surface topography at the same sample location. The reason for this is because, in the method, with the probe-sample distance where the probe intermittently contacts the sample surface whereby a favorable profile of surface topography can be obtained, control of the probe-sample distance and detection of the frequency are difficult.

As above, in order to improve spatial resolution of MFM, effort to increase detection sensitivity of the force gradient has been made by using mechanical resonance phenomenon of the cantilever; however, significant increase has become difficult.

With respect to the measurement of high-frequency magnetic field by using MFM, frequency component of the high-frequency magnetic field needs to include the value near the resonance frequencies ($f_0$) of the cantilever or high-order component of the resonance frequencies ($n \times f_0$: n is a positive integer). Examples measured in the past may be an alternating magnetic field of a single frequency near the resonance frequencies of the cantilever and an alternating magnetic field which has a resonance frequencies component of the cantilever and of which frequency is modulated. Conventionally, measurement of these specified frequencies, except for those in the alternating magnetic field, has been difficult. Moreover, these alternating magnetic fields oscillate the cantilever at high-order resonance frequencies or high-order resonance frequencies. However, with only the result of oscillation of the cantilever, the alternating magnetic field as the generation source cannot be identified.

Accordingly, an object of the present invention is to provide a surface state measuring device which enables to measure a force changing with an arbitrary frequency and which exhibits excellent spatial resolution performance, and to provide a surface state measuring method using the device. The change of alternating force with an arbitrary frequency may seemingly be caused when magnetic force of alternating magnetic field, electric force of alternating electric field, and exchange force between magnetic spins of the probe and the sample are changed by the alternating magnetic field or be caused when an interatomic chemical bonding force between the probe and the sample is changed with alternating electric field.

Means for Solving the Problems

Hereinafter, the present invention will be described. In order to make the understanding of the present invention easier, reference numerals of FIG. 1 are quoted in brackets; however, the present invention is not limited by the embodiment shown in FIG. 1. is a schematic view showing an example about the structure of the surface state measuring device of the present invention.

The first aspect of the present invention is a surface state measuring device (10) for measuring surface state of a sample (2) by detecting modulation of the oscillations of the probe (1) arranged over the sample, comprising: an excitation mechanism (6) for exciting a cantilever having a probe; a scanning mechanism for making the probe scan the sample by moving the probe and the sample relative to each other; an alternating force generator (3) for generating an alternating force of an arbitrary frequency in a space between the sample and the probe; a modulation measuring mechanism (4) for measuring degree of periodic frequency modulation of the oscillation of the probe, which is attributed to a periodic change of apparent spring constant of the cantilever having the prove caused by attracting force and repulsive force which are periodically applied to the probe by the alternating force, by employing frequency demodulation, by amplitude demodulation, or by an intensity of a sideband spectrum among sideband spectrums generated by the frequency modulation.

In the invention, the term "scanning mechanism" may be a mechanism being configured to control movement of the probe and the sample; such a scanning mechanism may be a known mechanism used for, e.g. a conventional scanning probe microscope. The term "alternating force" means a force of which amplitude and direction are changed periodically and which acts on the probe. The "alternating force changing with an arbitrary frequency" means, for example, as described above, the case where not only magnetic force by an alternating magnetic field and electric force by an alternating electric field change, but also exchange force between magnetic spins in a space between the probe and the sample is changed with an alternating magnetic field; or the case where an interatomic chemical bonding force between the probe and the sample is changed with alternating electric field.

By generating alternating force in a space between the sample and the probe, frequency modulation occurs in oscillation of the excited probe. So, by measuring degree of the frequency modulation (e.g. modulation index), it is possible to measure response to the alternating force generated in the measuring space with high spatial resolution. It should be noted that, in the invention, the term "sample" means a sample that is different from the alternating force generator; in a case when measuring a portion which is included in an alternating force generator and which generates alternating force (hereinafter, it may be referred to as "alternating force generating portion".), the alternating force generating portion may be regarded as a sample.

In the surface state measuring device (10) according to the first aspect of the invention, the alternating force may be an alternating magnetic field or an alternating electric field. By the mode, an alternating magnetic field response or an alternating electric field response caused in the measuring space can be measured with high resolution.

In the surface state measuring device (10) according to the first aspect of the invention, the alternating force may exclude resonance frequencies of the cantilever having the probe.

In the surface state measuring device (10) according to the first aspect of the invention, it is preferable that: the frequency of the alternating force is the one having a range where sideband intensity of the frequency modulation caused when applying an alternating force to the cantilever having the probe being excited near the resonance frequencies does not attenuate to the level of the noise of thermal vibration of the cantilever having the probe or less; the excitation mechanism is configured to excite the probe with a frequency near the resonance frequencies of the cantilever having the probe; and the modulation measuring mechanism is configured to measure degree of periodic frequency modulation of the oscillation of the cantilever having the probe by frequency demodulation or by an intensity of a sideband spectrum among sideband spectrums generated by the frequency modulation. By the mode, it is possible to measure a magnetic field or an electric field of a frequency of direct current to a frequency of several kilohertz with high sensitivity. Particularly, the mode is advantageous for a measuring magnetic field or an electric field of a low frequency near a static field.

In the surface state measuring device (10) according to the first aspect of the invention, it is preferable that: the frequency of the alternating force is the one having a range where sideband intensity of the frequency modulation caused when applying an alternating force to the cantilever having the probe being excited near the resonance frequencies does attenuate to the level of the noise of thermal vibration of the cantilever having the probe or less; the excitation mechanism is configured to excite the cantilever having the probe so that frequency of a sideband spectrum among sideband spectrums generated by the frequency modulation of the probe generated by an alternating force synchronizes with the resonance frequencies of the cantilever having the probe by adjusting the frequency to be different from the resonance frequencies; the modulation measuring mechanism is configured to measure degree of periodic frequency modulation of the oscillation of the probe generated by application of an alternating force to the probe, up to the upper limit frequency capable of mechanically oscillating the cantilever having the probe, by frequency demodulation, by amplitude modulation, or by an intensity of a sideband spectrum synchronized with resonance frequencies of the cantilever of the probe. By the mode, it is possible to evaluate frequency dependence on an alternating magnetic field response of a soft magnetic sample with an arbitrary frequency.

In the surface state measuring device (10) according to the first aspect of the invention, a magnetic probe showing hard magnetic property can be used as the probe (1), the sample (2) may be a sample showing soft magnetic property, and the alternating force may be a force generated by an alternating magnetic field. By the mode, it is possible to evaluate frequency dependence on an alternating magnetic field response of a soft magnetic sample with an arbitrary frequency.

Here, in the invention, the material showing soft magnetic property is a soft magnetic material, which is used as electromagnetic element of alternating current, such as transformer and magnetic recording head. The typical example thereof is soft iron; other examples include: silicon steel sheet; permalloy as an alloy of iron, and nickel; supermalloy as an alloy of iron, nickel, and molybdenum; and ferrite as an iron oxide; and sendust as an alloy of iron, silicon, and aluminum.

In the field of magnetic recording media, an amount showing difficulty of magnetization reversal is called "coercive force" (Hc, unit: Oe [oersted]). A considerably small coercive force which does not attract other material is called "soft magnetic material", and the coercive force of soft magnetic material is in a range of 0.002-0.5 Oe. The usage of the soft magnetic material may be: iron core of transformers, and iron core of motors and generators; permalloy is used for head of hard disk media of personal computers, and permalloy and sendust are used for magnetic head of cassette recorder. The soft magnetic material functions in writing and reading on the magnetic recording media such as disk and tape. The coercive force can be obtained from a magnetic hysteresis curve measured by a vibrating sample magnetometer (VSM).

On the other hand, the materials showing hard magnetic property is hard magnetic material, i.e. the so-called permanent magnet. Examples of materials showing hard magnetic property include: oxide of iron and chromium; ferrite as iron oxide containing barium and/or strontium; alnico as an alloy of aluminum, cobalt, and nickel; rare-earth cobalt-based magnet as an alloy of samarium and cobalt; neodymium-iron-based magnet; platinum-iron-based magnet; and platinum-cobalt-based magnet. The materials showing hard magnetic property are used not only for motor and speaker, but also for magnetic recording media such as hard disk media and cassette/VTR tape.

The materials showing hard magnetic property has extremely large coercive force to attract other materials. So, it is important to keep the already-written data before rewriting. In other words, the hard magnetic material is required to have an opposite property to that of the magnetic head, which is made of soft magnetic material which is required to quickly change the magnetic field so as to rapidly and accurately write data. The coercive force of the materials showing hard magnetic property is several kilo-oersted to dozens of kilo-oersted, which is extremely large compared with the observed soft magnetic materials.

The surface state measuring device (10) according to the first aspect of the invention characterized in that the probe (1) is a magnetic probe showing hard magnetic property, the sample (2) is a sample showing soft magnetic property, and the alternating force is a force generated by an alternating magnetic field, preferably further comprises an imaging mechanism which obtains image of degree of alternating magnetic field response of the sample having the soft magnetic property. By the mode, it is possible to easily evaluate spatial distribution about the alternating magnetic field response of soft magnetic property with an arbitrary frequency. The imaging mechanism is preferably the one to obtain image of response amplitude and phase delay as a degree of alternating magnetic field response. By the mode, it is possible to obtain an image of distribution of complex magnetic susceptibility when applying high-frequency magnetic field to the sample having soft magnetic property.

It should be noted that the real number component of the complex magnetic susceptibility is a quotient of a magnetization component, which changes in synchronization with a high-frequency magnetic field applied to the sample, divided by a magnetic field; the imaginary number component is a quotient of a magnetization component, which changes quarter cycle (90°) late relative to a high-frequency magnetic field, divided by a magnetic field. These correspond to loss of the magnetic material.

In the surface state measuring device (10) according to the first aspect of the invention, the probe (1) may be a magnetic probe having soft magnetic property, the sample (2) may be a sample having hard magnetic property, and the alternating force may be a force generated by an alternating magnetic field. By the mode, it is possible to detect a sharp magnetic gradient near the sample, which could not have been detected by the conventional technique due to the strong surface force; it is also possible to improve the spatial resolution performance.

The surface state measuring device (10) according to the first aspect of the invention characterized in that the probe (1) is a magnetic probe showing soft magnetic property, the sample (2) is a sample having hard magnetic property, and the alternating force is a force generated by an alternating magnetic field, preferably further comprises an imaging mechanism which obtains image of magnetic field gradient near the sample having hard magnetic property. By the mode, the surface state measuring device can be suitably used for measuring the state of recorded magnetization on, such as, hard disk media for magnetic recording in which recording bit has been recorded.

In the surface state measuring device (10) according to the first aspect of the invention, the probe (1) may be a charged probe or a probe having ferroelectricity, the sample (2) may be a sample having ferroelectricity, and the alternating force may be a force generated by an alternating electric field. By the mode, in the same manner as the case of magnetic field gradient, it is possible to measure degree in response of alternating electric field of a sample having ferroelectricity, for example, a recording element with piezoelectric material such as FeRAM.

The surface state measuring device (10) according to the first aspect of the invention characterized in that the probe (1) is a charged probe or a probe showing ferroelectricity, the sample (2) is a sample having ferroelectricity, and the alternating force is a force generated by an alternating electric field, preferably further comprises an imaging mechanism for obtaining image of degree of alternating electric field response of the material having ferroelectricity. By the mode, it is possible to easily evaluate spatial distribution of alternating electric field response of the material having ferroelectricity with an arbitrary frequency. The function of the imaging mechanism is preferably the one to obtain image of response amplitude and phase delay as the degree of alternating magnetic field response. By the mode, it is possible to evaluate spatial distribution of complex permittivity when applying high-frequency magnetic field to the sample having ferroelectricity.

It should be noted that the real number component of the complex permittivity is a quotient of an electric polarization component, which changes in synchronization with a high-frequency electric field applied to the sample, divided by an electric field; the imaginary number component is a quotient of an electric polarization component, which changes quarter cycle (90°) late relative to a high-frequency electric field, divided by an electric field. These correspond to loss of the ferroelectric material.

In the surface state measuring device (10) according to the first aspect of the invention, the excitation mechanism (6) may have a function to sweep the excitation frequency of the cantilever (11). By the mode, even if the alternating force having a plurality of frequency components is generated, by sweeping the excitation frequency of the cantilever and detecting the signal with the resonance frequencies of the cantilever, it is possible to detect each frequency component of the alternating force, independently.

The second aspect of the present invention can attain the above object by a surface state measuring method for measuring surface state of a sample by detecting modulation of oscillation of a probe (1) arranged over the sample (2), comprising the steps of: exciting a cantilever (11) having a probe; making the probe scan the sample by moving the probe and the sample relative to each other; generating alternating force of an arbitrary frequency in a space between the sample and the probe; and measuring degree of periodic frequency modulation of the oscillation of the probe, which is attributed to a periodic change of apparent spring constant of the cantilever having the prove caused by attracting force and repulsive force which are periodically applied to the probe by the alternating force, by employing frequency demodulation, by amplitude demodulation, or by an intensity of a sideband spectrum among sideband spectrums generated by the frequency modulation.

In the surface state measuring method of the second aspect of the invention, the alternating force may be an alternating magnetic field or an alternating electric field.

In the surface state measuring method of the second aspect of the invention, the alternating force may exclude resonance frequencies of the cantilever having the probe.

In the surface state measuring method of the second aspect of the invention, it is preferable that: the frequency of the alternating force is the one having a range where sideband intensity of the frequency modulation caused when applying an alternating force to the cantilever having the probe being excited near the resonance frequencies does not attenuate to the level of the noise of thermal vibration of the cantilever having the probe or less; the excitation is to excite the probe with a frequency near the resonance frequencies of the cantilever having the probe; and degree of periodic frequency modulation of the oscillation of the probe is measured by frequency demodulation or by an intensity of a sideband spectrum among sideband spectrums generated by the frequency modulation.

In the surface state measuring method of the second aspect of the invention, it is preferable that: the frequency of the alternating force is the one having a range where sideband intensity of the frequency modulation caused when applying an alternating force to the cantilever having the probe being excited near the resonance frequencies does attenuate to the level of the noise of thermal vibration of the cantilever having the probe or less; the excitation is to excite the cantilever having the probe so that frequency of a sideband spectrum among sideband spectrums generated by an frequency modulation of the probe generated by the alternating force synchronizes with the resonance frequencies of the cantilever having the probe by adjusting the frequency to be different from the resonance frequencies; degree of periodic frequency modulation of the oscillation of the probe is measured by frequency demodulation, by an amplitude demodulation, or by an intensity of a sideband spectrum synchronized with the resonance frequencies of the cantilever having the probe.

Effects of the Invention

As above, by utilizing frequency modulation or amplitude modulation of the probe oscillation occurred by causing alternating force of an arbitrary frequency in the measuring space, the device of the present invention enables to carry out the following measurement, which has been impossible by the conventional devices.

Although the conventional devices can measure only a limited alternating magnetic field or alternating electric field depending on the resonance frequencies of the probe, the surface state measuring device of the invention can measure an alternating force at an arbitrary frequency.

That is, the present invention provides a surface state measuring device that can create an image based on the response amplitude as a degree of response of the high-frequency magnetic field about a soft magnetic sample, by applying a frequency modulation of the probe oscillation occurred with application of an alternating magnetic field to the case of observing a soft magnetic sample by hard magnetic probe.

Moreover, according to the invention, when applying the frequency modulation of the probe oscillation occurred with application of an alternating magnetic field to the case of observing a hard magnetic sample by a soft magnetic probe, it is possible to obtain an image of a sharp magnetic gradient at the vicinity of the hard magnetic sample; thereby it is possible to provide a surface state measuring device which can attain a high spatial resolution.

BRIEF DESCRIPTION OF THE DRAWINGS

FIG. 10 is a schematic view illustrating the surface state measuring device of the invention at a time of measuring alternating magnetic field;

FIG. 11A is a profile of surface topography, FIG. 11B is an amplitude image of the alternating magnetic field, and FIG. 11C is a phase image, when the excitation current frequency of a single-pole-type head for perpendicular magnetic recording is 100 kHz;

Figure 1:
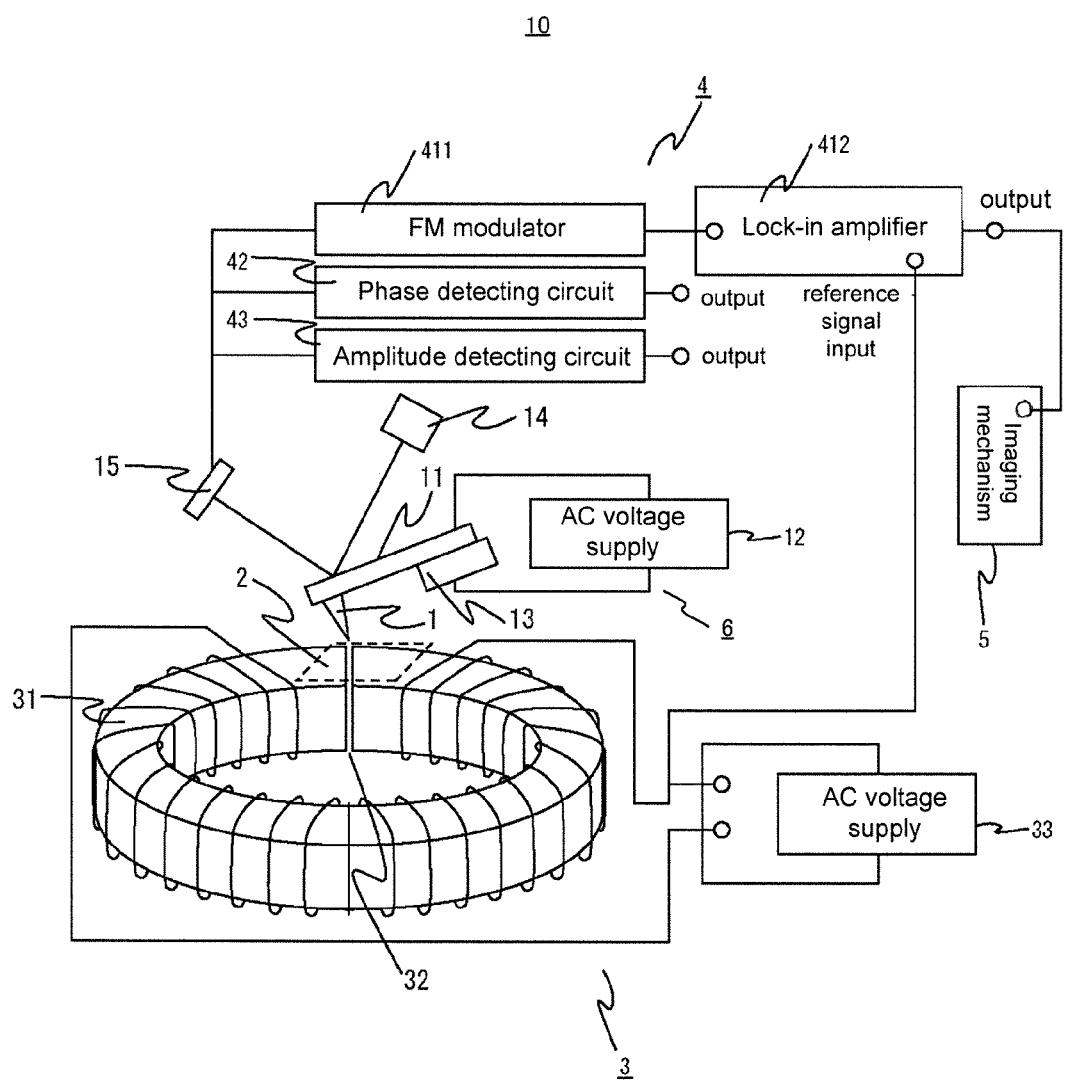
FIG. 1 is a schematic view showing an example about the structure of the surface state measuring device of the present invention.

DESCRIPTION OF THE REFERENCE NUMERALS 1 probe
2 sample
3 alternating force generator
4 modulation measuring mechanism
5 imaging mechanism
6 excitation mechanism
10 surface state measuring device
11 cantilever
411 FM demodulator (demodulating device)
412 lock-in amplifier (strength measurement system)

BEST MODE FOR CARRYING OUT THE INVENTION

<Surface State Measuring Device>

Hereinafter, the surface state measuring device of the present invention will be described with reference to the drawings. As shown in FIG. 1, a surface state measuring device 10 of the invention comprises: a cantilever 11 having a probe 1 provided at a vicinity of the free end thereof and arranged over a sample 2; an excitation mechanism 6 configured to excite the cantilever 11; a scanning mechanism (not shown) configured to make the probe 1 scan the sample 2 by moving the probe 1 and the sample 2 relative to each other; an alternating force generator 3 for applying an alternating magnetic field of an arbitrary frequency to the measuring space; and a modulation measuring mechanism 4 for measuring the frequency modulation or degree of the amplitude modulation of oscillation of the probe 1 generated by the alternating magnetic field.

The alternating force generator 3 comprises: a cut core 31 (i.e. a core having a gap 32 obtained by cutting a toroidal core in a radial direction.); and an AC voltage supply 33 for supplying power to the cut core 31. The sample 2 is placed on the gap 32 as the magnetic field generating portion of the cut core 31.

The excitation mechanism 6 comprises: an excitation actuator 13 attached to the base portion of the cantilever 11; and an AC voltage supply 12 which is connected to the excitation actuator 13. The excitation mechanism 6 can excite the cantilever 11 with an arbitrary frequency. When the excitation mechanism 6 excites the cantilever 11, the probe 1 provided to the cantilever 11 is excited with a constant frequency. So, by irradiate laser from a light source 14 to the tip of the free end side of the cantilever 11 and detecting the reflected light using optical displacement sensor 15, it is possible to obtain the displacement of the probe 1 as the output.

The modulation measuring mechanism 4 comprises: an FM demodulator 411 formed of an analog circuit as a demodulating device; and a lock-in amplifier 412 as a strength measurement system. The modulation measuring mechanism 4 further comprises: functions used in the conventional magnetic force microscopes, i.e. a phase detecting circuit 42 and an amplitude detecting circuit 43. In addition, the output of the lock-in amplifier 412 is connected to, for example, an imaging device 5 to create image from an external input signal of e.g. scanning microscope with measuring positional information. The output from the optical displacement sensor 15, which is obtained by relatively scanning the surface of the sample 2 by using the probe 1 and detecting the surface information, is connected to the FM demodulator 411; and then, the output from the FM demodulator 411 is connected to the input signal terminal of the lock-in amplifier 412. Moreover, to the reference signal terminal of the lock-in amplifier 412, a voltage signal of the AC voltage supply 33 of the alternating force generator is connected.

The First Embodiment

Hereinafter, with reference to the surface state measuring device 10 according to the first embodiment of the present invention, a method to adjust the excitation frequency of the cantilever to be the proximity of the mechanical resonance frequencies of the cantilever will be described.

In a case where the cantilever 11 is provided with a magnetic probe as the probe 1, when a high alternating magnetic field is applied to the probe 1, the frequency of the probe 1 is modulated. By scanning the degree of the frequency modulation (i.e. modulation index) with the probe 1 and creating the image, it is possible to measure the high-frequency magnetic field response occurring in the measuring space with high spatial resolution. The mechanism and the reasons will be described.

Firstly, a case where a magnetic probe showing hard magnetic property as the probe 1 is used to observe the sample 2 showing soft magnetic property will be described. Considering the vibration of the probe 1 when applying alternating magnetic field [H cos($\omega_m$t)] of the vibration frequency $\omega_m$ different from the resonance frequencies of the cantilever 11, the alternating magnetic field does not become an excitation force. However, if the cantilever is forcibly oscillated by other methods, when the direction of the alternating magnetic field works as repulsive force to the probe 1, the effective spring constant of the cantilever decreases; and when the direction of the alternating magnetic field works as repulsive force to the probe 1, the effective spring constant of the cantilever 11 increases. Therefore, by the alternating magnetic field, the effective change of the spring constant $k_0$ of the cantilever is regarded as the spring constant of the formula 1.

(Formula 1)

$$k_0 + \Delta k \cos(\omega_m t) \tag{1}$$

If the magnetic probe 1 is magnetic monopole type, the magnetic force is shown by the formula 2.

(Formula 2)

$$q_{tip} H_z \tag{2}$$

(wherein, $q_{tip}$ is a magnetic charge at the tip-end of the probe; and $H_z$ is a magnetic field component along the displacement direction of the probe).

Here, z-direction is vertical direction to the sample surface and is displacement direction of the probe 1. When the magnetic probe 1 is monopole type, the length of the magnetic moment of the magnetic probe 1 is larger than the distance between the magnetic probe 1 and the sample 2 to be measured. Therefore, effective change of the spring constant $\Delta k$ of the cantilever corresponding to the gradient of the magnetic force is shown by the formula 3.

(Formula 3)

$$\Delta k = q_{tip} \frac{\partial H_z}{\partial z} \quad (3)$$

On the other hand, if the magnetic probe 1 is magnetic dipole type, the magnetic force is shown by the formula 4.

(Formula 4)

$$m_{tip} \frac{\partial H_z}{\partial z} \quad (4)$$

($m_{tip}$: magnetic moment of the probe 1)

Therefore, the effective change of the spring constant $\Delta k$ of the cantilever corresponding to the gradient of the magnetic force is shown by the formula 5.

(Formula 5)

$$\Delta k = m_{tip} \frac{\partial^2 H_z}{\partial z^2} \quad (5)$$

($m_{tip}$: magnetic moment of the probe)

If the effective spring constant changes periodically when the cantilever 11 is forcibly oscillated, equation of motion of the cantilever 11 can be shown by the formula 6.

(Formula 6)

$$m \frac{d^2 z(x)}{dt^2} + m\gamma \frac{dz(x)}{dt} + (k_0 + \Delta k \cos(\omega_m t))z(x) = F_0 \cos(\omega_d t) \quad (6)$$

(m: mass of the probe, γ: attenuation coefficient, $\omega_d$: angular frequency of oscillation, $F_0$: amplitude of excitation force, z: displacement of the probe)

γ is a coefficient of friction of the motion, and the relation of γ with performance index Q of the mechanical resonance of the probe 1 is: $Q=\omega_0/\gamma$. γ can be reduced by evacuating the air from the measurement atmosphere. Here, the formula 7:

(Formula 7)

$$\omega_0 = \sqrt{\frac{k_0}{m}}, \quad (7)$$

is a resonance frequencies of the cantilever 11 before application of the alternating magnetic field.

To set up the z(t), if the periodic oscillatory solution is shown as the formula 8, (Formula 8)

$$z(t) = \hat{z} \exp(i\omega t) \quad (8),$$

and the exciting force is shown as: $F=F_0 \exp(i\omega t)$, then these formulas are substituted into the formula 6, the formula 9 is given.

(Formula 9)

$$z(t) = \frac{F_0 \exp(i\omega t)}{((k_0 - m\omega^2) + m\gamma(i\omega) + \Delta k \cos(\omega_m t))} \quad (9)$$

If $\Delta k \ll k_0$ substantially, the value of the formula 9 is the solution of the formula 6. The premise satisfies the present invention when a magnetic field is applied to the probe 1. Here, as shown in the formula 7, if the resonance frequencies of the probe being proportional to the square root of the spring constant are several hundreds of kilohertz, variation width of the frequency by the frequency modulation is several dozens of hertz.

Actual oscillatory solution can be obtained by obtaining a real number of the formula 9, i.e. Re [z(t)].

Considering the case of exciting the cantilever 11 with a resonance frequencies $\omega_0$ of the cantilever 11 before application of the alternating magnetic field, the formula 10 is given.

(Formula 10)

$$z(t) = \frac{F_0 \exp(i\omega t)}{(m\gamma(i\omega_0) + \Delta k \cos(\omega_m t))} \quad (10)$$

Here, the formula 11 is given.

(Formula 11)

$$\frac{1}{(m\gamma(i\omega_0) + \Delta k \cos(\omega' t))} = \frac{-im\gamma\omega_0}{(\Delta k \cos(\omega' t))^2 + (m\gamma\omega_0)^2}\left(1 + i\frac{\Delta k}{m\gamma\omega_0}\cos(\omega' t)\right) =$$

$$\frac{-im\gamma\omega_0}{(\Delta k \cos(\omega' t))^2 + (m\gamma\omega_0)^2}\sqrt{1 + \left(\frac{\Delta k}{m\gamma\omega_0}\cos(\omega' t)\right)^2}$$

$$\exp\left[i\tan^{-1}\left(\frac{\Delta k}{m\gamma\omega_0}\cos(\omega' t)\right)\right] \quad (11)$$

So, the formula 12 can be obtained.

(Formula 12)

$$z(t) = \frac{-im\gamma\omega_0}{(\Delta k \cos(\omega' t))^2 + (m\gamma\omega_0)^2}\left(1 + i\frac{\Delta k}{m\gamma\omega_0}\cos(\omega' t)\right)F_0 e^{i\omega_0 t} = \quad (12)$$

$$\frac{-im\gamma\omega_0}{(\Delta k \cos(\omega' t))^2 + (m\gamma\omega_0)^2}\sqrt{1 + \left(\frac{\Delta k}{m\gamma\omega_0}\cos(\omega' t)\right)^2}$$

$$\exp\left[i\tan^{-1}\left(\frac{\Delta k}{m\gamma\omega_0}\cos(\omega' t)\right)\right]F_0 e^{i\omega_0 t}$$

In the case of the present invention where the magnetic field is applied to the probe 1, the size of $\Delta k$ is not larger than the size of $m\gamma\omega_0$. So, the formula 13 is obtained.

(Formula 13)

$$z(t) \cong Re\left[\frac{-i}{m\gamma\omega_0}\exp\left[i\tan^{-1}\left(\frac{\Delta k}{m\gamma\omega_0\omega_0}\right)\cos(\omega' t)\right]F_0 e^{i\omega_0 t}\right] \quad (13)$$

$$\cong Re\left[\frac{-i}{m\gamma\omega_0}\exp\left[i\left(\frac{\Delta k}{m\gamma\omega_0\omega_0}\cos(\omega' t) - \frac{1}{3}\left(\frac{\Delta k}{m\gamma\omega_0\omega_0}\cos(\omega' t)\right)^3 + \right.\right.\right.$$

$$\left.\left.\left.\frac{1}{5}\left(\frac{\Delta k}{m\gamma\omega_0\omega_0}\cos(\omega' t)\right)^5 + \ldots\right)\right]F_0 e^{i\omega_0 t}\right]$$

$$\cong Re\left[\frac{F_0}{m\gamma\omega_0}\exp\left[i\left(\omega_0 t + \frac{\Delta k}{m\gamma\omega_0\omega_0}\cos(\omega' t) - \right.\right.\right.$$

$$\left.\left.\left.\frac{1}{3}\left(\frac{\Delta k}{m\gamma\omega_0\omega_0}\cos(\omega' t)\right)^3 + \frac{1}{5}\left(\frac{\Delta k}{m\gamma\omega_0\omega_0}\cos(\omega' t)\right)^5 + \ldots - \frac{\pi}{2}\right)\right]\right]$$

$$\cong \frac{F_0}{m\gamma\omega_0}\cos\left(\omega_0 t + \frac{\Delta k}{m\gamma\omega_0\omega_0}\cos(\omega' t) - \right.$$

$$\left.\frac{1}{3}\left(\frac{\Delta k}{m\gamma\omega_0\omega_0}\cos(\omega' t)\right)^3 + \frac{1}{5}\left(\frac{\Delta k}{m\gamma\omega_0\omega_0}\cos(\omega' t)\right)^5 + \ldots - \frac{\pi}{2}\right)$$

$$= \frac{F_0}{m\gamma\omega_0}\sin\left(\omega_0 t + \frac{\Delta k}{m\gamma\omega_0\omega_0}\cos(\omega' t) - \frac{1}{3}\left(\frac{\Delta k}{m\gamma\omega_0\omega_0}\cos(\omega' t)\right)^3 + \right.$$

$$\left.\frac{1}{5}\left(\frac{\Delta k}{m\gamma\omega_0\omega_0}\cos(\omega' t)\right)^5 + \ldots\right)$$

Accordingly, by the periodic change of the magnetic force between the probe 1 and the sample 2, it can be understood that the frequency modulation (FM) in which frequency of the probe 1 changes periodically occurs.

When the size of $\Delta k$ is sufficiently smaller than the size of $m\gamma\omega_0$, it is a narrow-band FM and is shown by the formula 14.

(Formula 14)

$$z(t) \cong \frac{F_0}{m\gamma\omega_0}\sin\left(\omega_0 t + \frac{\Delta k}{m\gamma\omega_0\omega_0}\cos(\omega' t)\right) \quad (14)$$

By rearranging the formula 11 for each oscillation frequency, the formula 15 can be obtained.

(Formula 15)

$$z(t) \cong Re\left[\frac{-i}{m\gamma\omega_0}\exp\left[i\tan^{-1}\left(\frac{\Delta k}{m\gamma\omega_0}\cos(\omega' t)\right)\right]F_0 e^{i\omega_0 t}\right] \quad (15)$$

$$\cong Re\left[\frac{-i}{m\gamma\omega_0}\left(1 + i\frac{\Delta k}{m\gamma\omega_0}\cos(\omega' t) + \frac{1}{2}\left(\frac{\Delta k}{m\gamma\omega_0}\cos(\omega' t)\right)^2 + \right.\right.$$

$$\left.\left.i\frac{1}{2}\left(\frac{\Delta k}{m\gamma\omega_0}\cos(\omega' t)\right)^3 + \ldots\right)F_0 e^{i\omega_0 t}\right]$$

$$\cong \frac{F_0}{m\gamma\omega_0}\sin(\omega_0 t) + \frac{F_0}{2m\gamma\omega_0}\left(\frac{\Delta k}{m\gamma\omega_0}\right)(\cos((\omega_0 + \omega')t) +$$

$$\cos((\omega_0 - \omega')t)) + \frac{F_0}{8m\gamma\omega_0}\left(\frac{\Delta k}{m\gamma\omega_0}\right)^2$$

$$(\cos((\omega_0 + 2\omega')t) + \cos((\omega_0 - 2\omega')t)) +$$

$$\frac{F_0}{16m\gamma\omega_0}\left(\frac{\Delta k}{m\gamma\omega_0}\right)^3(\sin((\omega_0 + 3\omega')t) +$$

$$\sin((\omega_0 - 3\omega')t)) + \ldots$$

By the frequency modulation (FM), it can be understood that the sideband wave is shown by the formula (16) occurs.

$$\omega = \omega_0 \pm n\omega' \text{ (wherein, } n \text{ is an integer)} \quad (16)$$

When the size of $\Delta k$ is sufficiently smaller than the size of $m\gamma\omega 0$, it becomes the narrow-band FM and shown by the formula 17.

(Formula 17)

$$z(t) \cong \quad (17)$$

$$\frac{F_0}{m\gamma\omega_0}\sin(\omega_0 t) + \frac{F_0}{2m\gamma\omega_0}\left(\frac{\Delta k}{m\gamma\omega_0}\right)(\cos((\omega_0 + \omega')t) + \cos((\omega_0 - \omega')t))$$

This phenomenon is similar to the frequency modulation phenomenon which occurs in a resonant electrical circuit when the circuit element constant is periodically changed around the resonance frequencies. In the above formula, when the magnetic probe 1 is the above single magnetic pole type, the modulation index $k_f$ of the frequency modulation can be shown by the formula 18.

(Formula 18)

$$k_f = \frac{\Delta k}{m\gamma\omega_0} = \frac{q_{tip}}{m\gamma\omega_0}\frac{\partial H(x)}{\partial z} \quad (18)$$

When the magnetic probe 1 is the above magnetic dipole type, the modulation index $k_f$ of the frequency modulation can be shown by the formula 19.

(Formula 19)

$$k_f = \frac{\Delta k}{m\gamma\omega_0} = \frac{m_{tip}}{m\gamma\omega_0}\frac{\partial^2 H(x)}{\partial z^2} \quad (19)$$

In other words, when the probe oscillates, a frequency modulation occurs from an alternating magnetic field as the modulation source. The frequency component is not only $\omega_0$ component of the drive frequency, but also $(\omega_0+\omega_m)$ and $(\omega_0-\omega_m)$ components of equal strength, $(\omega_0+2\omega_m)$ and $(\omega_0-2\omega_m)$ components of equal strength, and so on. The phenomenon is similar to the frequency modulation phenomenon which occurs in the resonant electrical circuit when the circuit element constant is periodically changed around the resonance frequencies. The above case is the case that the cantilever 11 is mechanically excited with the resonance frequencies $\omega_0$ of the cantilever 11 before the application of alternating magnetic field. In the method, by performing frequency demodulation, it is possible to measure an alternating magnetic field ranging from an extremely low alternating magnetic field which is near the direct-current (DC) magnetic field to several kilohertz, with high sensitivity. However, if the frequency of the alternating magnetic field increases, the frequency component occurred by the frequency modulation becomes apart from the resonance frequencies, so the intensity of frequency modulation spectra is reduced. Therefore, by this method, it is difficult to measure a magnetic field of high frequency.

Next, a case in which a magnetic probe showing soft magnetic property is used as the probe 1 to observe the sample 2 showing hard magnetic property. In view of probe oscillation when applying alternating magnetic field: $H \cos(\omega_m t)$ of frequency $\omega_m$ which is different from the resonance frequencies of the cantilever 11, if the magnetic moment of the probe 1 changes by the application of alternating magnetic field, magnetic force between the probe 1 and the sample 2 changes. Although the alternating magnetic field does not become an exciting force of the cantilever, if the cantilever is forcibly oscillated with other methods, when the magnetic field between the probe 1 and the sample 2 works as attracting force with the application of alternating magnetic field, the effective spring constant of the cantilever 11 decreases; and when the magnetic force between the probe 1 and the sample 2 works as repulsive force, the effective spring constant of the cantilever 11 increases. Therefore, by the alternating magnetic field, the effective change of the spring constant $k_0$ of the cantilever 11 is regarded as the spring constant of the formula 20.

(Formula 20)

$$k_0 + \Delta k \cos(\omega_m t) \qquad (20)$$

If the magnetic probe 1 is magnetic monopole type, the magnetic force between the probe 1 and the sample 2 is shown by the formula 21.

(Formula 21)

$$H_z q_{tip} \cos(\omega_m t) \qquad (21)$$

(wherein, $q_{tip}$ is a magnetic charge at the tip-end of the probe 1, and $H_z$ is a magnetic field component along the displacement direction of the probe).

Here, z-direction is vertical direction to the sample surface and is a displacement direction of the probe 1. So, when the magnetic probe 1 is monopole type, the length of the magnetic moment of the magnetic probe 1 is larger than the distance between the magnetic probe 1 and the sample 2 to be measured. Therefore, effective change of the spring constant $\Delta k$ of the cantilever 11 corresponding to the gradient of the magnetic force is shown by the formula 22.

(Formula 22)

$$\Delta k = q_{tip} \frac{\partial H_z}{\partial z} \qquad (22)$$

On the other hand, if the magnetic probe 1 is magnetic dipole type, the magnetic force is shown by the formula 23.

(Formula 23)

$$\frac{\partial H_z}{\partial z} m_{tip} \cos(\omega_m t) \qquad (23)$$

($m_{tip} \cos(\omega_m t)$: magnetic moment of the probe 1)
Therefore, the effective change of the spring constant $\Delta k$ of the cantilever corresponding to the gradient of the magnetic force is shown by the formula 24.

(Formula 24)

$$\Delta k = m_{tip} \frac{\partial^2 H_z}{\partial z^2} \qquad (24)$$

($m_{tip}$: magnetic moment of the probe 1)
If the effective spring constant changes periodically when the cantilever 11 is forcibly oscillated, in the same manner as the case where a magnetic probe showing hard magnetic property is used as the probe 1 to observe the sample 2 showing soft magnetic property, the equation of motion of the cantilever 11 can be shown by the formula 25.

(Formula 25)

$$m \frac{d^2 z(x)}{dt^2} + m\gamma \frac{dz(x)}{dt} + (k_0 + \Delta k \cos(\omega_m t)) z(x) = F_0 \cos(\omega_d t) \qquad (25)$$

(m: mass of the probe, $\gamma$: attenuation coefficient, $\omega_d$: angular frequency of oscillation, $F_0$: amplitude of excitation force, z: displacement of the probe)

$\gamma$ is a coefficient of friction of the motion, and the relation of $\gamma$ with performance index Q of the mechanical resonance of the probe 1 is: $Q = \omega_0/\gamma$.

As the solution of the formula 25, the following shown by the formula 26 can be obtained.

(Formula 26)

$$z(t) \cong \frac{F_0}{m\gamma\omega_0} \sin\left(\omega_0 t + \frac{\Delta k}{m\gamma\omega_0} \cos(\omega' t) - \frac{1}{3}\left(\frac{\Delta k}{m\gamma\omega_0} \cos(\omega' t)\right)^3 + \frac{1}{5}\left(\frac{\Delta k}{m\gamma\omega_0} \cos(\omega' t)\right)^5 + \ldots\right) \qquad (26)$$

When the size of $\Delta k$ is sufficiently smaller than the size of $m\gamma\omega_0$, it becomes a narrow-band FM and is shown by the formula 27.

(Formula 27)

$$z(t) \cong \frac{F_0}{m\gamma\omega_0} \sin\left(\omega_0 t + \frac{\Delta k}{m\gamma\omega_0} \cos(\omega' t)\right)$$

$$\cong \frac{F_0}{m\gamma\omega_0} \sin(\omega_0 t) + \frac{F_0}{2m\gamma\omega_0} \left(\frac{\Delta k}{m\gamma\omega_0}\right)(\cos((\omega_0 + \omega')t)$$

$$\cos((\omega_0 - \omega')t)) \qquad (27)$$

In the formula 27, when the magnetic probe 1 is monopole type, the modulation index $k_f$ of the frequency modulation is shown by the formula 28.

(Formula 28)

$$k_f = \frac{\Delta k}{m\gamma\omega_0} = \frac{q_{tip}}{m\gamma\omega_0} \frac{\partial H(x)}{\partial z} \qquad (28)$$

On the other hand, when the magnetic probe 1 is magnetic dipole type, the modulation index $k_f$ of the frequency modulation is shown by the formula 29.

(Formula 29)

$$k_f = \frac{\Delta k}{m\gamma\omega_0} = \frac{m_{tip}}{m\gamma\omega_0} \frac{\partial^2 H(x)}{\partial z^2} \qquad (29)$$

In other words, when the magnetic probe having soft magnetic property is used as the probe 1 to observe the sample 2 showing hard magnetic property, it is understood that a frequency modulation occurs from an alternating magnetic field as the modulation source during the probe oscillation. Frequency modulation also occurs when the probe-sample distance is short; so the measurement of magnetic force at the vicinity of the sample can be performed, which has been impossible by the conventional techniques. That is, by the present invention, it is possible to detect a sharp magnetic gradient at the vicinity of the sample, which has been impossible due to the strong surface force; thereby spatial resolution can be improved.

The Second Embodiment

Figure 4:
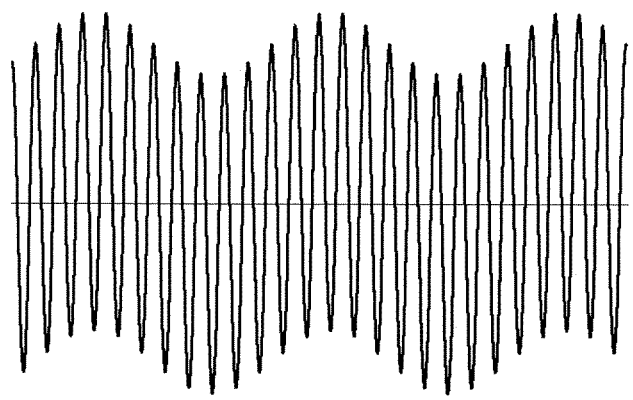
FIG. 4 is a graph showing a probe oscillation modulated with an alternating magnetic field.

Hereinafter, as the second embodiment of the surface state measuring device 10 of the present invention, a mode, in which excitation frequency of the cantilever 11 is selected so that an arbitrary ($\omega_0 \pm n\omega_m$) component (wherein, n is an integer.) generated by the frequency modulation of the probe oscillation matches with the resonance frequencies of the cantilever 11, will be described. FIG. 4 is a graph showing a probe oscillation modulated with an alternating magnetic field. This embodiment enables to measure, with high sensitivity, the frequency modulation of the probe oscillation caused by the alternating magnetic field of high frequency. In this circumstance, strength of the ($\omega_0 + n\omega_m$) component and the ($\omega_0 - n\omega_m$) component is different.

Now, let us consider the case where the ($\omega_0 - \omega_m$) component is equal to the resonance frequencies $\omega_0$ of the cantilever 11. The ($\omega_0 + n\omega_m$) component significantly attenuates compared with the ($\omega_0 - \omega_m$) component; therefore, the displacement of the probe derived from the formulae 17 and 27 can be shown by the formula 30.

(Formula 30)
$$z(t) \cong \frac{F_0}{m\gamma\omega_0}\sin(\omega_0 t) + \frac{F_0}{2m\gamma\omega_0}\left(\frac{\Delta k}{m\gamma\omega_0}\right)\cos((\omega_0 - \omega')t) \quad (30)$$

The formula 30 can further be developed to the formula 31.

(Formula 31)
$$\begin{aligned}
z(t) &\cong \frac{F_0}{m\gamma\omega_0}\sin(\omega_0 t) + \frac{F_0}{2m\gamma\omega_0}\left(\frac{\Delta k}{m\gamma\omega_0}\right)\cos((\omega_0 - \omega')t) \\
&= \frac{F_0}{m\gamma\omega_0}\left(\sin(\omega_0 t) + \left(\frac{\Delta k}{2m\gamma\omega_0}\right)\cos((\omega_0 - \omega')t)\right) \\
&= \frac{F_0}{m\gamma\omega_0}\left(\sin(\omega_0 t) + \left(\frac{\Delta k}{2m\gamma\omega_0}\right)\right. \\
&\quad \left.(\sin(\omega_0 t)\sin(\omega' t) + \cos(\omega_0 t)\cos(\omega' t))\right) \\
&= \frac{F_0}{m\gamma\omega_0}\left(\sin(\omega_0 t) + \left(\frac{\Delta k}{2m\gamma\omega_0}\right)\cos(\omega' t)\cos(\omega_0 t)\right) + \\
&\quad \frac{F_0 \Delta k}{2(m\gamma\omega_0)^2}\sin(\omega' t)\sin(\omega_0 t) \\
&\cong \frac{F_0}{m\gamma\omega_0}\left(\sin\left(\omega_0 t + \left(\frac{\Delta k}{2m\gamma\omega_0}\right)\cos(\omega' t)\right)\right) + \\
&\quad \frac{F_0 \Delta k}{2(m\gamma\omega_0)^2}\sin(\omega' t)\sin(\omega_0 t)
\end{aligned} \quad (31)$$

The first term of the formula 31 is a term in which the amplitude does not change with time but the frequency does change with time, and the formula shows the frequency modulation of the probe oscillation. The second term of the formula 31 shows an amplitude modulation in which the frequency does not change with time but the amplitude does change with time. In the frequency modulation of the first term, the angular frequency changes with the angular frequency $\omega'$ of the alternating magnetic field to be applied and the modulation index $k_f$ of the frequency modulation can be given as $\Delta k/(2m\gamma\omega_0)$. In the amplitude modulation of the second term, the angular frequency changes with the angular frequency $\omega'$ of the alternating magnetic field to be applied and the modulation index $k_a$ of the amplitude modulation factor can be given as $F_0 \Delta k/(2(m\gamma\omega_0)^2)$. FIG. 4 schematically shows the probe oscillation of the formula 31.

In this case, by performing frequency demodulation or amplitude demodulation, the alternating magnetic field to be applied can be measured.

When using frequency demodulation, so as to inhibit error caused by the amplitude modulation at the same time, the amplitude is amplified and kept constant by using e.g. limiting circuit and then frequency demodulation is carried out.

Figure 5:
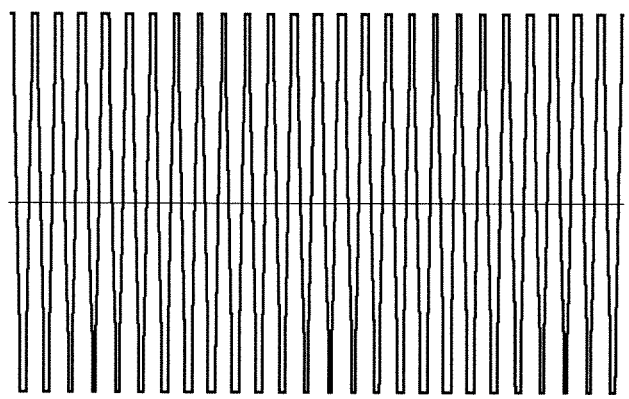
FIG. 5 is a graph in which the signal of FIG. 4 is made constant at a certain absolute value of the amplitude.

FIG. 5 is a graph in which the signal of FIG. 4 is made constant at a certain absolute value of the amplitude. To the signal, the frequency demodulation is performed.

When the amplitude demodulation is employed, only the second term of the formula 31 contributes to the amplitude modulation; it is understood that the ratio of amplitude modulation $F_0 \Delta k/(2(m\gamma\omega_0)^2)$ is equal to the change in strength of the ($\omega_0 - \omega_m$) component of the formula 30. Therefore, by measuring the change in strength of the ($\omega_0 - \omega_m$) component, it is possible to measure the alternating magnetic field.

In the second embodiment of the invention, even if the alternating magnetic field having a plurality of frequency components, by sweeping the excitation frequency of the cantilever 11 and detecting signals with the resonance frequencies of the cantilever 11, it is possible to independently detect each frequency component of the alternating magnetic field. So, although the conventional method cannot identify the alternating magnetic field, the present invention can identify the alternating magnetic field by sweeping the excitation frequency of the cantilever 11.

<Surface State Measuring Method>

The surface state measuring method of the present invention will be described. The surface state measuring method of the invention is a measurement method employing the surface state measuring device. More specifically, the surface state measuring method comprises the steps of: exciting the cantilever 11 having the probe 1 at the vicinity of the free end thereof and generating simultaneously an alternating force of an arbitrary frequency in the measuring space by the alternating force generator 3; measuring by using modulation measuring mechanism 4 a degree of frequency modulation or amplitude modulation of the oscillation of the probe 1 generated by the alternating force. The modulation measuring step may comprise the steps of: generating, by the alternating force generator 3, an alternating force of an arbitrary frequency in the measuring space while exciting the cantilever 11 and making the probe 1 scan the surface of the sample 2; and measuring, by the modulation measuring mechanism 4, the degree of frequency modulation or amplitude modulation of the oscillation of the probe 1 generated by the alternating force.

When measuring the surface state of the sample 2 in the above manner, it is preferable to carry out the step of measuring modulation after carrying out the step for measuring the surface shape of the sample 2 by making the probe 1 scan on the sample 2 (surface shape measuring step). The "surface shape measuring step" is to measure the surface shape of the sample 2, so a conventional known method can be used. By the mode of the method, it is possible to evaluate the surface state of the sample 2 by considering the topography of the surface.

In addition, the surface shape measuring step and the step of measuring modulation are preferably carried out at the same time. By the mode, mutual relation of the surface shape and alternating magnetic field can be accurately analyzed and the measurement time can be shortened.

Examples

Hereinafter, the surface state measuring device of the present invention will be described by way of the following examples.

FIG. 1 is a schematic view showing an example of the surface state measuring device 10 of the present invention. As shown in FIG. 1, the base part of the cantilever 11 which is provided with the probe 1 at one end thereof, comprises: an oscillation mechanism 6 having an AC voltage supply 12 for oscillation and an excitation actuator 13 and is configured to oscillate the probe 1 with a constant frequency. By irradiating the end of the cantilever 11 with a laser from a light source 14 and detecting the reflected light by an optical displacement sensor 15, displacement of the probe 1 is taken as the output.

The surface state measuring device shown in FIG. 1 is an example which comprises a cut core 31 (i.e. a core having a gap 32 obtained by cutting a toroidal core in a radial direction.) as an alternating force generator; a sample 2 is placed on the gap 32 as the magnetic field generating portion of the cut core 31. It should be noted that, when the frequency is several megahertz or more in the alternating force generator 3 using a magnetic substance, the magnetic field intensity of the magnetic substance is decreased by the alternating-current loss; therefore, in the frequency range of several megahertz or more, a magnetic substance-free air-cored coil is used instead. In addition, in FIG. 1, an FM demodulator 411 comprising an analog circuit is used as a demodulator constituting the modulation measuring mechanism 4; and a lock-in amplifier 412 is used as a strength measurement system. Moreover, a phase detecting circuit 42 and an amplitude detecting circuit 43 as a function of the conventional magnetic force microscope are provided. Further, the output of the lock-in amplifier 412 is connected to an apparatus 5 which can obtain an image of an external input signal from, for example, a scanning probe microscope with the measuring positional information.

The output from the optical displacement sensor 15, which is detected by making the probe 1 relatively scan the surface of the sample 2, is connected to the FM demodulator 411; and the output from the FM demodulator 411 is connected to the input signal terminal of the lock-in amplifier 412. To the reference signal terminal of the lock-in amplifier 412, voltage signal of an AC voltage supply 33 of the alternating force generator 3 is connected.

Figure 2:
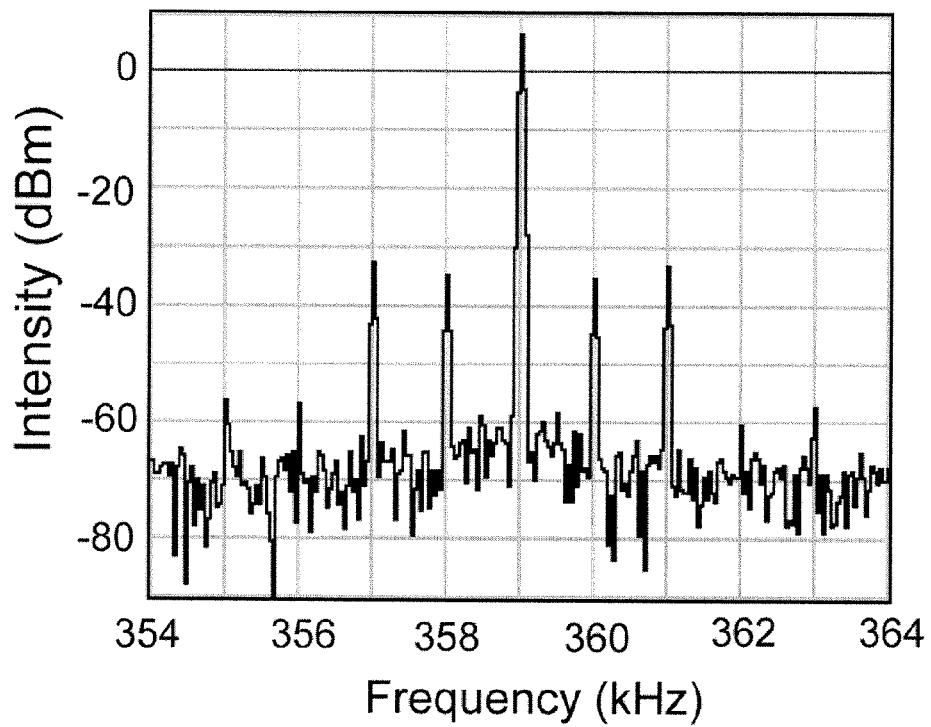
FIG. 2 is a graph showing an oscillation spectrum of the probe in the Examples.

FIG. 2 shows a spectrum of the displacement output of the probe 1 from the optical displacement sensor 15 when generating an alternating magnetic field with a frequency of several kilohertz by applying an electrical current of 2 A, 1 kHz to the current coil (coil turns of 50) for generating a magnetic field in the cut core 31. The measured alternating magnetic field is the magnetic field generated from the cut core 31 for generating magnetic field, so the sample 2 is not placed on the cut core 31. When the sample 2 is placed, alternating magnetic field from the sample 2 of which magnetic field intensity changes depending on the measurement position is measured.

The core material used for the cut core 31 is a FeSiNbBCu-based nanocrystalline soft material called "FINEMET" (trademark of Hitachi Metals, Ltd.). The core has an inner diameter of 12 mm, an outer diameter of 20 mm, a height of 5 mm, and a gap width of 1 mm. The measurement is carried out in the air atmosphere and the Q-value of the cantilever 11 is about 650. To detect the alternating magnetic field, a probe using FePt-based hard magnet thin film (manufactured by Nitto Optical Co., Ltd.) was used as the probe 1. The probe 1 is a vertical magnetic probe vertically-provided to the cantilever 11 against the surface of the sample 2.

The signal of the largest spectrum intensity in FIG. 2 is a signal caused by exciting the cantilever 11 with a frequency near the resonance frequencies of the cantilever 11 by using the excitation mechanism 6 comprising the AC voltage supply 12 and the piezoelectric element 13. The cantilever 11 with FePt-based probe which was used in the experiment was excited with a frequency of 359 kHz, i.e. near the resonance frequencies. By applying an alternating magnetic field, on the lower-frequency side and the upper-frequency side of the excitation frequency (359 kHz) as a center, sideband waves occur at ±1 kHz intervals being equal to the integral multiple of frequency of the applied alternating magnetic field. The spectrum corresponds to the typical spectrum produced when oscillation with the center frequency of 359 kHz is modulated with an excitation frequency of 1 kHz of the cantilever 11. The spectrum analyzer used in this measurement is "Real-Time Spectrum Analyzer RSA-3308A" manufactured by Tektronix.

Figure 3:
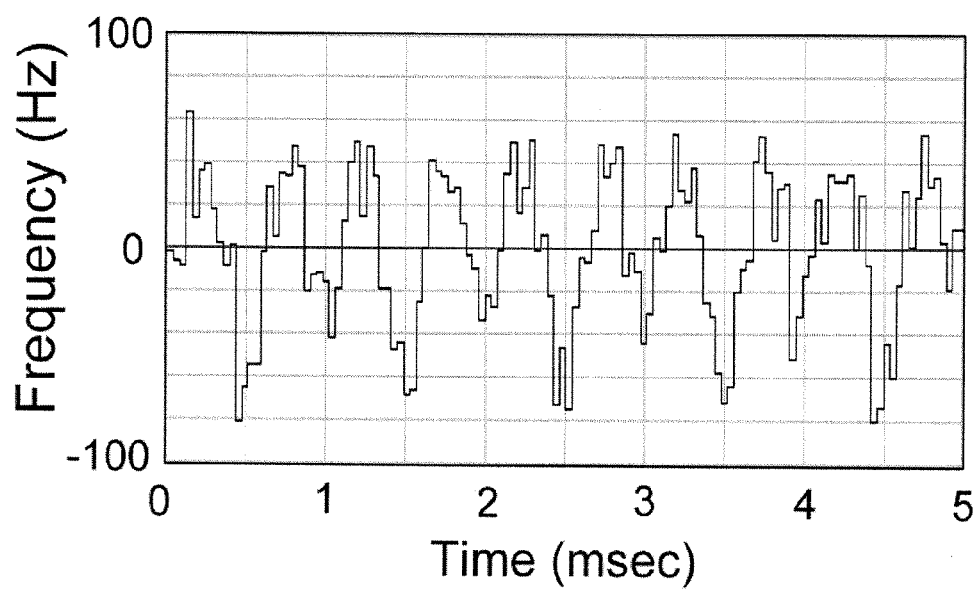
FIG. 3 is a graph showing the results of frequency demodulation of the oscillation signal of the probe in the Examples.

FIG. 3 shows signals obtained by directly demodulating the displacement output of the probe measured by the optical displacement sensor 15, by using the frequency demodulation function of the above Real-Time Spectrum Analyzer RSA-3308A. The signals is the frequency displacement from the central frequency to time when the excitation frequency (i.e. 359 kHz) of the cantilever 11 as the central frequency of the frequency modulation is set as the standard (i.e. 0 Hz). As seen from FIG. 3, the oscillation frequency of the probe 1 changes periodically within a width of ±60 Hz around the excitation frequency of the cantilever 11 as the center.

The range of frequency displacement $\Delta f$ has a relation with $\Delta \omega_{mag}$, that is: $\Delta f = \Delta \omega_{mag}/(2\pi)$.

So, the intensity of the magnetic field gradient occurred at the gap of the cut core to be the measurement position depends on the amount shown by the formula 32.

(Formula 32)

$$\frac{\partial H_z}{\partial z} \tag{32}$$

On the other hand, the frequency displacement of the excitation frequency changes with a period of 0.5 ms (frequency: 2 kHz), which corresponds to the spectrum intensity of the second sideband waves from the central frequency in FIG. 2 being relatively larger than the first sideband waves from the central frequency. This case seems to corresponds to the case where the modulation index $k_f$ of the frequency modulation is relatively large.

When measuring signals corresponding to the range of frequency displacement with the synchronous detection under the condition of FIG. 1 that the output of the FM demodulator 411 consisting of analog circuits is connected to the signal input of the lock-in amplifier 412 and the voltage signals of the AC voltage supply 33 for generating magnetic field of the cut core 31 is connected to the reference signal input of the lock-in amplifier 412, it was observed that an amplitude of the frequency demodulating wave of the Real-Time Spectrum Analyzer and signals corresponding to the phase difference between the frequency demodulating wave and the voltage signals of the AC voltage supply 33 for generating alternating magnetic field can be obtained.

By the above experiment results, it is experimentally confirmed that change of magnetic force between the probe 1 and the sample 2 with the alternating magnetic field causes frequency modulation of the probe oscillation. By utilizing the phenomenon, it is possible to detect an alternating magnetic field with a selected frequency and to detect a magnetic force at a vicinity of the sample. Although it is not shown in the drawings, for applying alternating electric field as an alternating force, an apparatus which applies high-frequency AC voltage to the parallel electrodes as an alternating force generator can be used.

Next, a ring head for magnetic recording was installed in a commercially available MFM apparatus ("JSPM-5400" manufactured by JEOL Ltd.) and then the MEM probe in a condition being mechanically excited by the piezoelectric element was moved towards the ring head close enough to observe image of surface topography at the gap end of the ring head. Thereafter, by applying an alternating magnetic field to the probe by the ring head, oscillation state of the probe was analyzed with a spectrum analyzer. The used MFM probe was an FePt high-coercivity probe (manufactured by Nitto Optical Co., Ltd., coercive force: 8 kOe); it was arranged so that the magnetization direction of the probe was normal to the head surface before measurement. The resonance frequencies of the probe is about 250 kHz.

Figure 6:
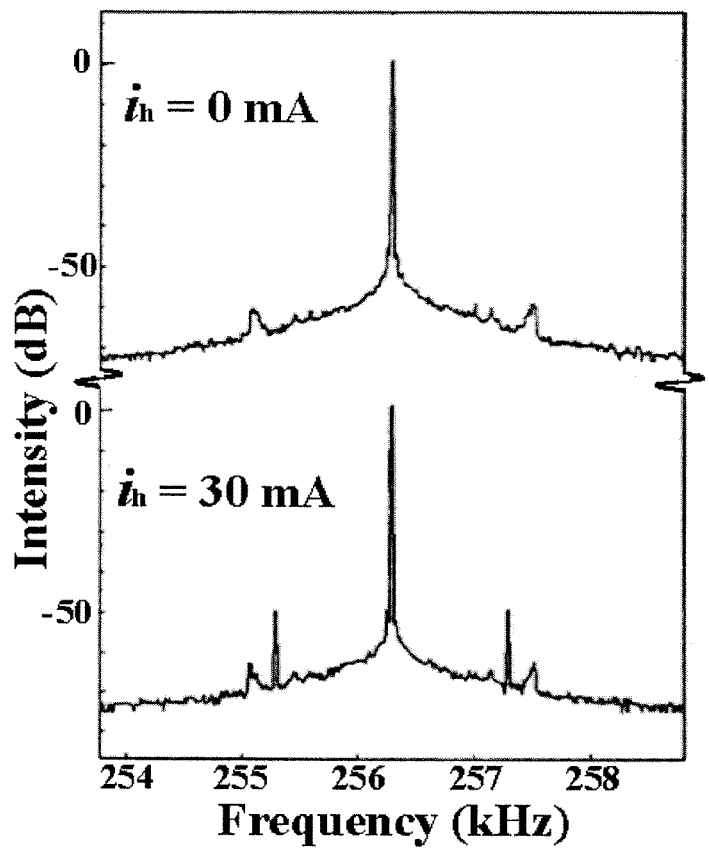
FIG. 6 is a graph showing probe's oscillation spectrum when the excitation current of the ring head for magnetic recording is 0 mA and 30 mA.

FIG. 6 is a graph showing an example of probe oscillation spectrum when the excitation current of the ring head for magnetic recording is 0 mA and 30 mA. In the experiment, the probe was excited near the resonance frequencies ($\omega_0$). The frequency ($\omega_m$) of the applied alternating magnetic field was 1 kHz. As seen from FIG. 6, it is understood that sharp sideband spectrums occurred at positions ($\omega=\omega_0\pm\omega_m$) 1 kHz away from an excitation spectrum of the probe by the application of alternating magnetic field. High-order sideband spectrum ($\omega=\omega_0\pm\omega_m$) was not observed. This case seems to correspond to the case where the modulation index $k_f$ of the frequency modulation is smaller. The frequency dependence on a base line of these spectrums is similar to that on the mechanical resonance performance factor Q of the probe, and it is presumably a noise of thermodynamic vibration of the probe caused by thermal energy. The intensity of the sideband spectrum at 30 mA is about 20 dB (×10) larger than the noise level.

Figure 7:
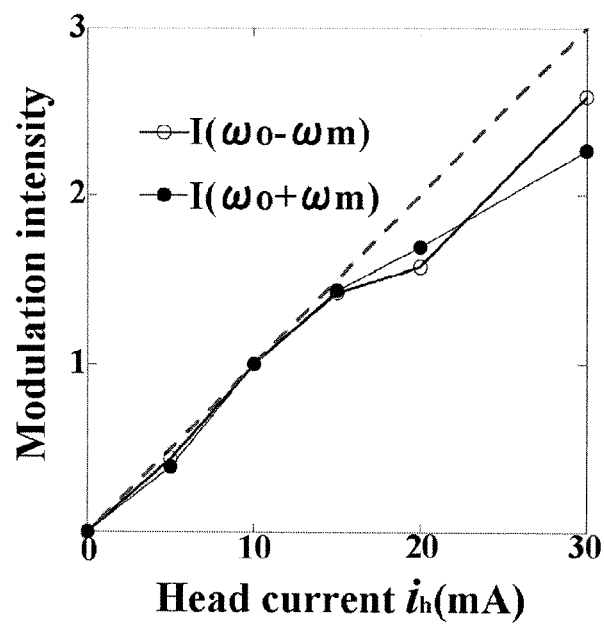
FIG. 7 is a graph showing excitation current dependence of relative strength in the low-frequency side and high-frequency side of the sideband spectrum when the strength of the sideband spectrum with an excitation current of 10 mA is the standard.

FIG. 7 shows excitation current dependence of the relative strength of the low-frequency side ($\omega=\omega_0-\omega_m$) and high-frequency side ($\omega=\omega_0+\omega_m$) of the sideband spectrum when intensity of the sideband spectrum with an excitation current of 10 mA is the standard. The intensity of the sideband spectrum increases in nearly proportion to the excitation current, but slight decrease can be observed at the higher current side. The intensity of magnetic field generated from the magnetic head is expected to be in nearly proportion to that of excitation current; therefore, the intensity of the sideband spectrum and the intensity of the magnetic field is presumed to be in a proportional relationship. According to the previously described theory, intensity of the first sideband spectrum is expected to be in a proportional relationship with the intensity of the magnetic field. Moreover, when analyzing the oscillatory waveform by using a frequency demodulating function of the spectrum analyzer, frequency modulation of the probe frequency was confirmed. When demodulating the obtained oscillatory waveform by an analog demodulator, the frequency modulation was confirmed.

Next, a single-pole-type head for perpendicular magnetic recording was installed on a stage of a commercially available MFM ("JSPM-5400" manufactured by JEOL Ltd.), and an image of an alternating magnetic field generated from the magnetic head was created.

Figure 8:
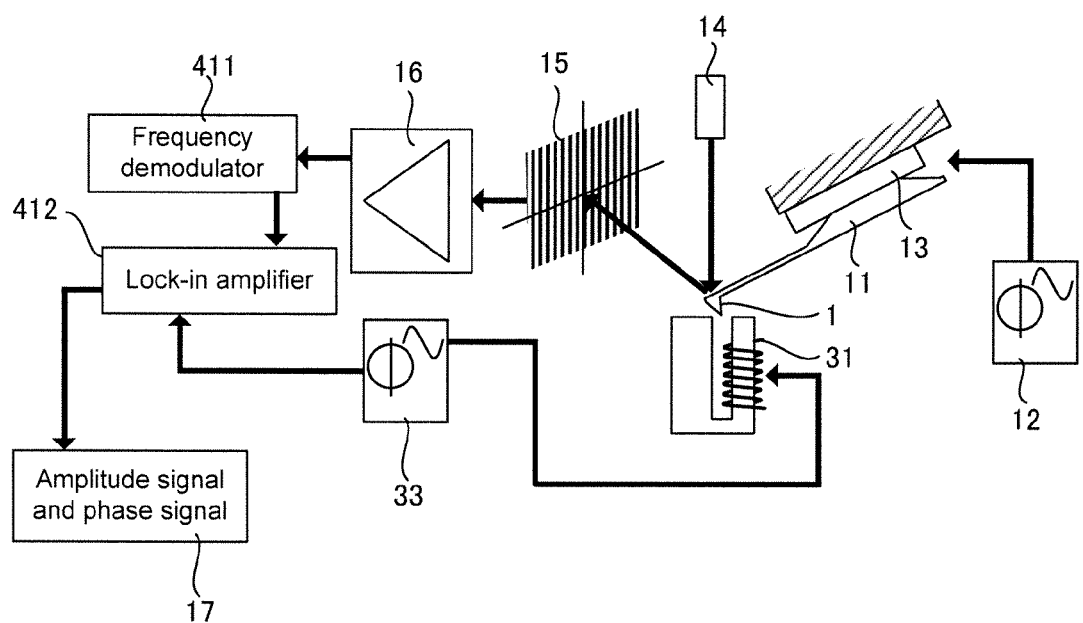
FIG. 8 is a schematic view illustrating the surface state measuring device of the invention at a time of measuring alternating magnetic field.

FIG. 8 schematically shows the measuring system. In FIG. 8, the common constituents as shown in FIG. 1 are indicated by the same reference numerals; and the description is omitted if it is not necessary. As shown in FIG. 8, the probe 1 is excited by applying AC voltage to the piezoelectric element 13 with a power source 12 in the MFM; and an alternating current (head current) was carried in the magnetic head 31 with an external power source 33 to generate an alternating magnetic field. By the alternating magnetic field generated by the magnetic head 33, frequency modulation occurs about the oscillation of the probe 1. The oscillation of the probe 1 was detected by a photodetector 15 in the MFM and the obtained signal was demodulated by using a PLL circuit (phase lock loop circuit) as the frequency demodulator 411 through an amplifier 16. An amplitude and phase of the frequency-demodulation signal was measured by using the lock-in amplifier 412 and an image based on the amplitude and phase was obtained by using a function of external signal input of the MFM. Here, as a reference signal of the lock-in amplifier 412, voltage of an external power source 33 used for generating the alternating magnetic field of the magnetic head 31 was used. The used MFM probe 1 was an FePt high-coercivity probe (manufactured by Nitto Optical Co., Ltd., coercive force: 8 kOe); it was arranged so that the magnetization direction of the probe was normal to the head surface before measurement. The resonance frequencies of the probe was about 298 kHz. The PLL circuit used in the measurement was "EASY PLL" manufactured by Nanosurf; the lock-in amplifier was a broadband digital lock-in amplifier 7280 manufactured by Signal Recovery Corporation. The amplifire was the one in the MFM.

Figure 9A:
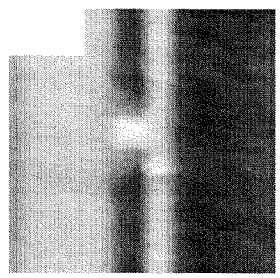
FIG. 9A is a profile of surface topography.
Figure 9B:
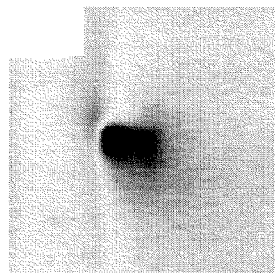
FIG. 9B is an amplitude image of the alternating magnetic field.
Figure 9C:
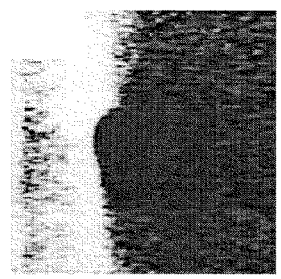
FIG. 9C is a phase image, when the excitation current frequency of a single-pole-type head for perpendicular magnetic recording is 500 Hz.

As an example, FIG. 9A shows a profile of surface topography, FIG. 9B shows an amplitude image of the alternating magnetic field, and FIG. 9C shows a phase image, when the excitation current frequency of the head of single magnetic pole for perpendicular magnetic recording is 500 Hz. The trapezoidal part seen in the center of the profile of surface topography of FIG. 9A is a main magnetic pole; the left side of the main magnetic pole is a trailing shield; and the portion between the main magnetic pole and the trailing shield is a head gap. The magnetic recording medium was placed on the head face; in this case, it moves relatively in the right-and-left direction. The magnetic field is generated from the main magnetic pole by excitation current and returned to the trailing shield through the magnetic recording medium. During the process, a large magnetic gradient which is important for recording can be obtained at the head gap position. The observation was carried out without the magnetic recording medium; as seen from the amplitude image of the alternating magnetic field of FIG. 9B, the largest magnetic field intensity was obtained at the main magnetic pole and a large magnetic field intensity was obtained even at the trailing shield portion across the head gap. In addition, as seen from the phase image of the alternating magnetic field of FIG. 9C, it can be understood that the contrast of the main magnetic pole side and the trailing shield side is significantly different. The difference of contrast corresponds to the phase difference of 180°; it can be seen that the polarity of the magnetic field is inverted. In other words, when the magnetic field of the main magnetic pole side is upward, the magnetic field of the trailing shield side is downward. These results synchronized with the movement of the single-pole-type head; thus, the image of the alternating magnetic field could be created with high spatial resolution.

The above method enables measurement with high sensitivity about a magnetic field of frequency up to several kilohertz; the method is particularly advantageous to measure a magnetic field of low frequency near the direct-current (DC) magnetic field. However, when the frequency of the magnetic field further increases, degree of frequency modulation becomes small, thereby the measurement becomes difficult. Because of this, another measurement method shown in FIG. 10 was invented. In FIG. 10, the common constituents as shown in FIGS. 1 and 8 are indicated by the same reference numerals; and the description is omitted if it is not necessary. The difference between the modes of FIGS. 8 and 10 is whether or not an external power source is used for excitation of the cantilever 11 during measurement of the alternating magnetic field. In the case of FIG. 10, by exciting the cantilever 11 with a sum of the resonance frequencies of the cantilever 11 to be used and the frequency of the alternating magnetic field desired to be measured, a strong modulation signal was obtained at the resonance frequencies of the cantilever 11. To measure an alternating magnetic field with high sensitivity by using the modulation signal, the lock-in amplifier 412 was used. The reference signal of the lock-in amplifier 412 was obtained by inputting the output of the power source 12 used for exciting the cantilever 11 and output of the power source 36 for generating a magnetic field into a multiplication apparatus 34, and then carrying them through a low-pass filter 35. It should be noted that when the profile of surface topography is observed, the excitation frequency of the cantilever 11 is set near the resonance frequencies. Since performance of the feedback control is good when obtaining the profile of surface topography obtained by keeping the probe 1-sample 2 distance constant, a clear profile of surface topography can be obtained. The lower limit of the frequency measured by the method depends on the cut-off performance of the frequency of the low-pass filter, so the method shown by FIG. 8 is advantageous for measuring an alternating magnetic field of a low frequency.

As an example, FIG. 11A shows a profile of surface topography, FIG. 11B shows an amplitude image of an alternating magnetic field, and FIG. 11C shows a phase image, when the excitation current frequency of a single-pole-type head for perpendicular magnetic recording is 100 kHz. In this case, the excitation frequency of the probe 1 described with reference to FIG. 10 is switched once each scanning line. By firstly obtaining information of the surface topography and then scanning the same area with 50 nm longer probe-sample distance, amplitude information and phase information of the alternating magnetic field were obtained. As seen from FIGS. 11A to 11C, the amplitude and the phase of the alternating magnetic field can be seen in the same manner as those in FIGS. 9A to 9C. So, it is possible to obtain images of the alternating magnetic field even with high frequency.

Next, by the surface state measuring device of the invention, magnetic recording property of the single-pole-type head for perpendicular magnetic recording was evaluated. To the magnetic head element, 5-40 mA of alternating current (head current) was carried by using an external power source to generate an alternating magnetic field of 100 Hz. Moreover, in the following examples, a commercially available MFM (a scanning probe microscope, "JSPM-5400" manufactured by JEOL Ltd.) was used; and a frequency demodulator ("EASY PLL" manufactured by Nanosurf) was added as a part of the modulation measuring mechanism. As the probe, a magnetic probe (FePt high-coercivity probe manufactured by Nitto Optical Co., Ltd., coercive force: 8 kOe or more) was used and vertically-provided against the viewing face of the magnetic head element. The probe was arranged at one end of the cantilever and was excited with a constant frequency by exciting the cantilever with an excitation mechanism provided to the other end of the cantilever. An end of the cantilever to which the probe was arranged was irradiated with a laser from an optical source, the reflected light was detected with an optical displacement sensor, and the viewing surface of the magnetic head element was scanned by the probe actuated by the scanning mechanism provided to the MFM. The distance between the probe and the viewing surface of the magnetic head (hereinafter, referred to as "probe-sample distance".) was adjusted to 1-150 nm. The signal detected by the optical displacement sensor was connected to the display device through the frequency demodulator and the lock-in amplifier. The measurement was carried out in the air atmosphere, and the probe was excited around the resonance frequencies, i.e. 350 kHz. The value of performance factor Q about mechanical resonance of the probe was about 500. The results are shown below.

Figure 12A:
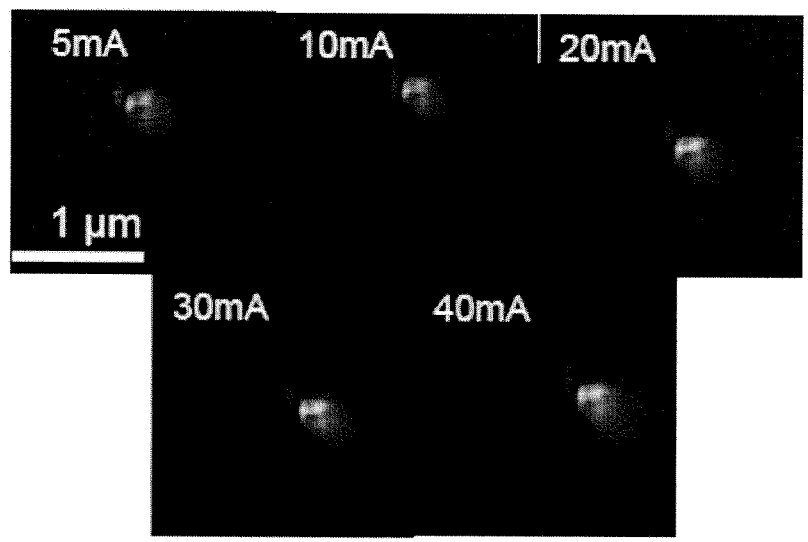
FIG. 12A is an amplitude image of the alternating magnetic field generated by a magnetic head element and FIG. 12B is a phase image of the alternating magnetic field, when the excitation current frequency of a single-pole-type head for perpendicular magnetic recording is 100 Hz.
Figure 12B:
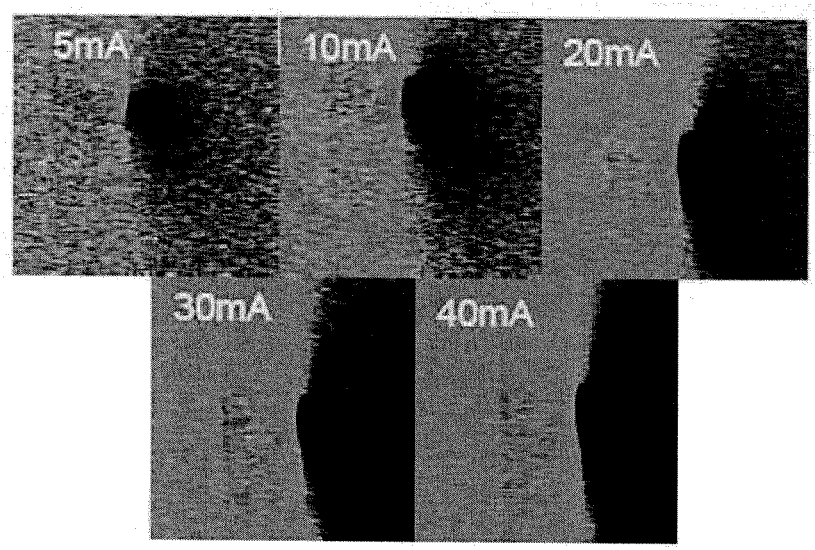

FIG. 12A shows a set of amplitude images of the alternating magnetic field and FIG. 12B is a set of phase images of the alternating magnetic field. FIG. 12A is a set of amplitude images of the alternating magnetic field which was generated by a magnetic head element and measured by the surface measurement device of the invention when the probe-sample distance was set to 10 nm and the head currents were set to 5 mA, 10 mA, 20 mA, 30 mA, and 40 mA. FIG. 12B is a set of phase images of the alternating magnetic field when measured under the same measurement conditions of FIG. 12A. Each image of FIGS. 12A and 12B are respectively amplitude images and phase images of the alternating magnetic field in an area of 2 μm×2 μm.

As shown in FIG. 12A, the largest magnetic field intensity was obtained at the main magnetic pole portion and a large magnetic field intensity was obtained even at the trailing shield portion which is left side of the main magnetic pole across the head gap. Moreover, as shown in FIG. 12B, it can be understood that the contrast of the main magnetic pole side and the trailing shield side is significantly different. The difference of contrast corresponds to the phase difference of 180°; it can be seen that the polarity of the magnetic field is inverted. In other words, when the magnetic field of the main magnetic pole side is upward, the magnetic field of the trailing shield side is downward. These results agreed with the characters of the head of single magnetic pole; thus, it is presumed that the image of the alternating magnetic field generated by the magnetic head element was obtained with high measurement sensitivity and with high spatial resolution.

Figure 13:
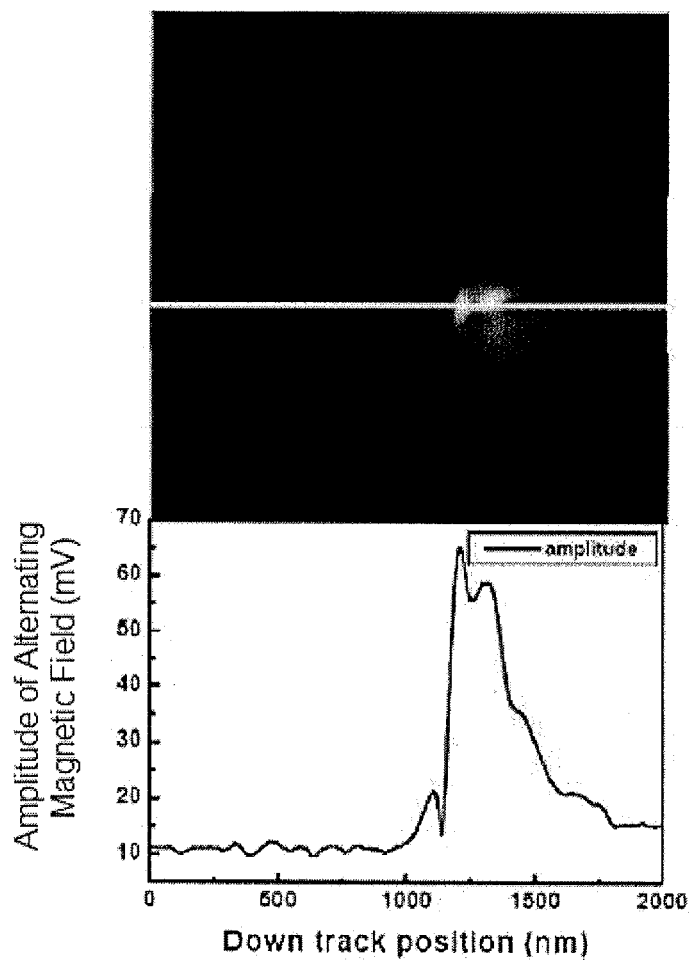
FIG. 13 is a plan, the upper side of which is an amplitude image, measured by the device for evaluating magnetic head of the invention, of the alternating magnetic field generated by the magnetic head element and the lower side of which is a signal profile of the amplitude image, when the excitation current frequency of a single-pole-type head for perpendicular magnetic recording is 100 Hz.

FIG. 13 is a plan measured by the device for evaluating magnetic head of the invention, the upper side of which is an amplitude image of the alternating magnetic field generated by the magnetic head element and the lower side of which is a signal profile of the amplitude image. The magnetic head element used in the case of FIG. 13 was different from that of FIG. 12. The signal profile shown in the lower image is the signal profile on a horizontally drawn line. The direction is the same direction as the relatively moving direction (down track direction) of the magnetic head element and the magnetic recording medium when using the magnetic head element for recording data on the magnetic recording medium. The horizontal axis of the lower graph indicates a position of the magnetic head element (unit: nm) in the down track direction; the vertical axis of the same indicates an output (unit: mV), measured by the surface state measuring device of the invention, from the lock-in amplifier corresponding to the amplitude of the alternating magnetic field generated by the viewing face of the magnetic head element.

As shown in FIG. 13, in the measurement result of the surface state measuring device of the invention, the amplitude of the alternating magnetic field generated from the magnetic head element changes sharply at the center of the Figure as the position of the head gap. The results correspond with the property of the head of single magnetic pole element. Therefore, according to the surface state measuring device of the present invention, the image of the alternating magnetic field generated by the magnetic head element seems to have been created with high measurement sensitivity and high spatial resolution.

Figure 14:
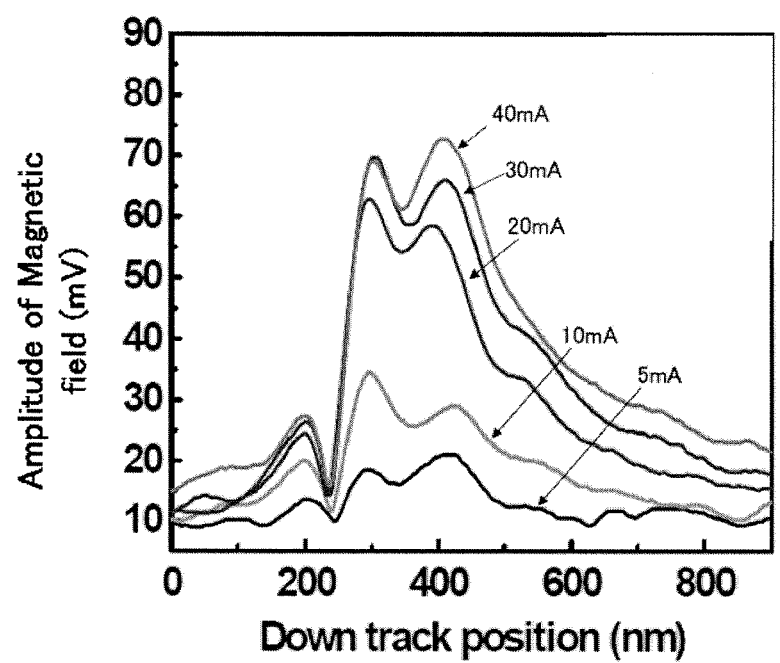
FIG. 14 is a graph showing a signal profile, measured by the device for evaluating magnetic head, of the amplitude image of the alternating magnetic field generated by a magnetic head element, when the excitation current frequency of a single-pole-type head for perpendicular magnetic recording is 100 Hz.

FIG. 14 is a graph showing a signal profile in the down track direction including the main magnetic pole of an amplitude image of the alternating magnetic field when the head current is set to 5 mA, 10 mA, 20 mA, 30 mA, and 40 mA. In FIG. 14, the values on the horizontal axis and the vertical axis are substantially the same as those in the lower image of FIG. 13. As shown in FIG. 14, with the increase of the head current, the alternating magnetic field generated by the magnetic head element also increases; then, the gradually saturated condition can be observed with high sensitivity and high spatial resolution.

Figure 15A:
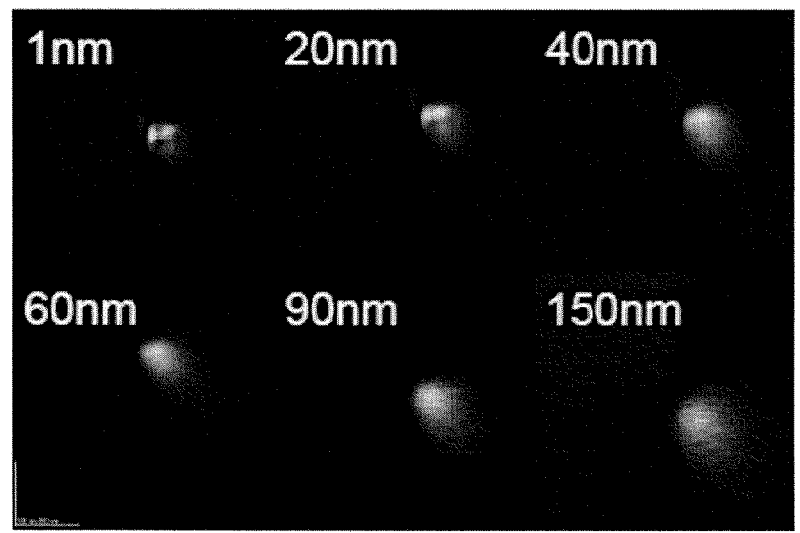
FIG. 15A is a set of amplitude images, measured by the device for evaluating magnetic head, of alternating magnetic fields generated by the magnetic head elements
Figure 15B:
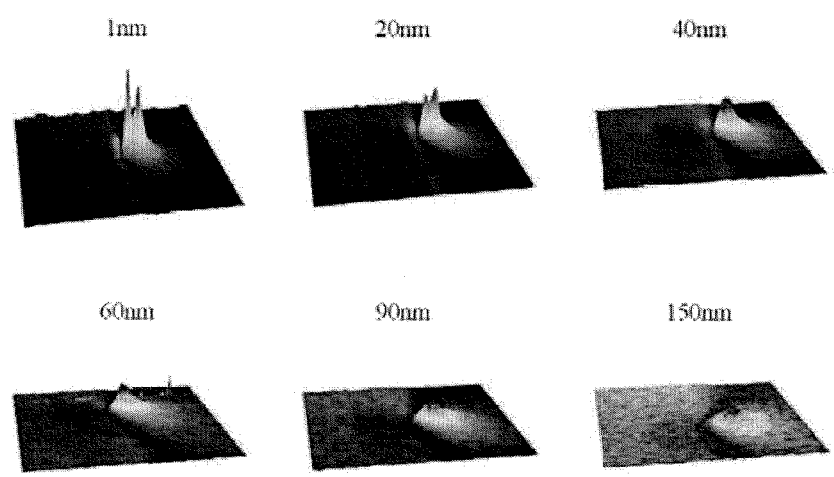
FIG. 15B is a set of 3D images converted from the amplitude images, when the excitation current frequency of a single-pole-type head for perpendicular magnetic recording is 100 Hz.

FIGS. 15A and 15B show dependence of the amplitude image of the alternating magnetic field on the probe-sample distance. FIG. 15A is a set of amplitude images, measured by the device for evaluating magnetic head of the invention, of alternating magnetic field generated by the magnetic head element when the head current is set to 20 mA and the probe-sample distance is set to 1 nm, 20 nm, 40 nm, 60 nm, 90 nm, and 150 nm. FIG. 15B is a set of 3D images converted from the amplitude images when measured under the same measurement conditions of FIG. 15A. Each image of FIGS. 15A and 15B are respectively amplitude images of the alternating magnetic field in an area of 2 μm×2 μm.

Figure 16A:
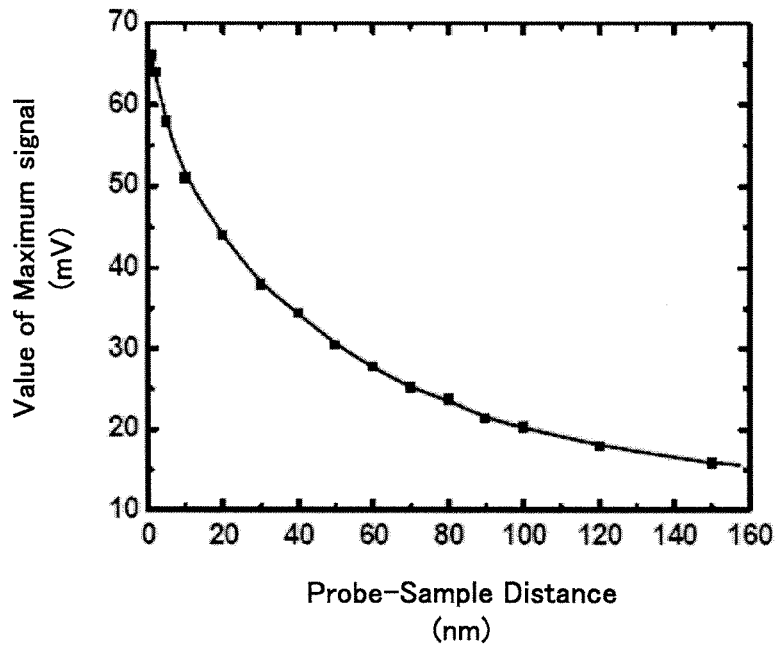
FIGS. 16A and 16B are plans showing dependency, on probe-sample distance, of maximum signal value, measured by the device for evaluating magnetic head, of the amplitude of the alternating magnetic field generated by the magnetic head element, when the excitation current frequency of a single-pole-type head for perpendicular magnetic recording is 100 Hz.
Figure 16B:
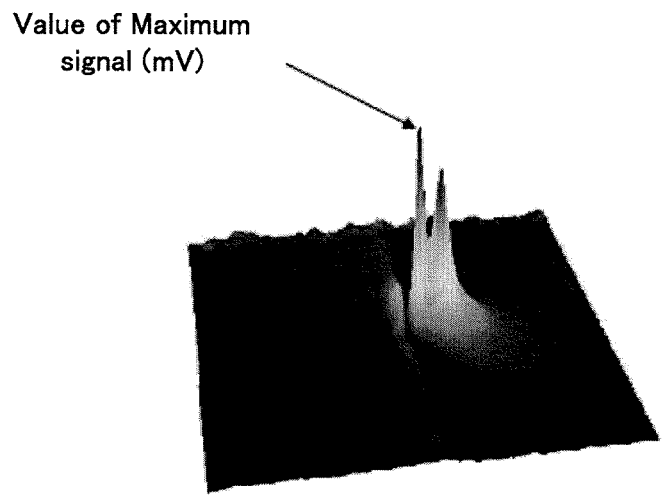

FIG. 16A is a plan showing dependency of maximum signal value on the probe-sample distance. The maximum signal value, as shown in FIG. 16B, means maximum amplitude of an alternating magnetic field generated by the magnetic head element measured by a device for evaluating the magnetic head element of the invention.

As shown in FIGS. 15A, 15B, and 16A, 16B, according to the present invention, when the probe-sample distance becomes shorter, the spatial expansion of the signal to be detected becomes smaller; at the same time, signal strength increases. Particularly, it is understood that, by the magnetic measurement within the shorter probe-sample distance as the feature of the present invention, alternating magnetic field generated by the magnetic head element can be observed with high sensitivity and high spatial resolution.

Figure 17:
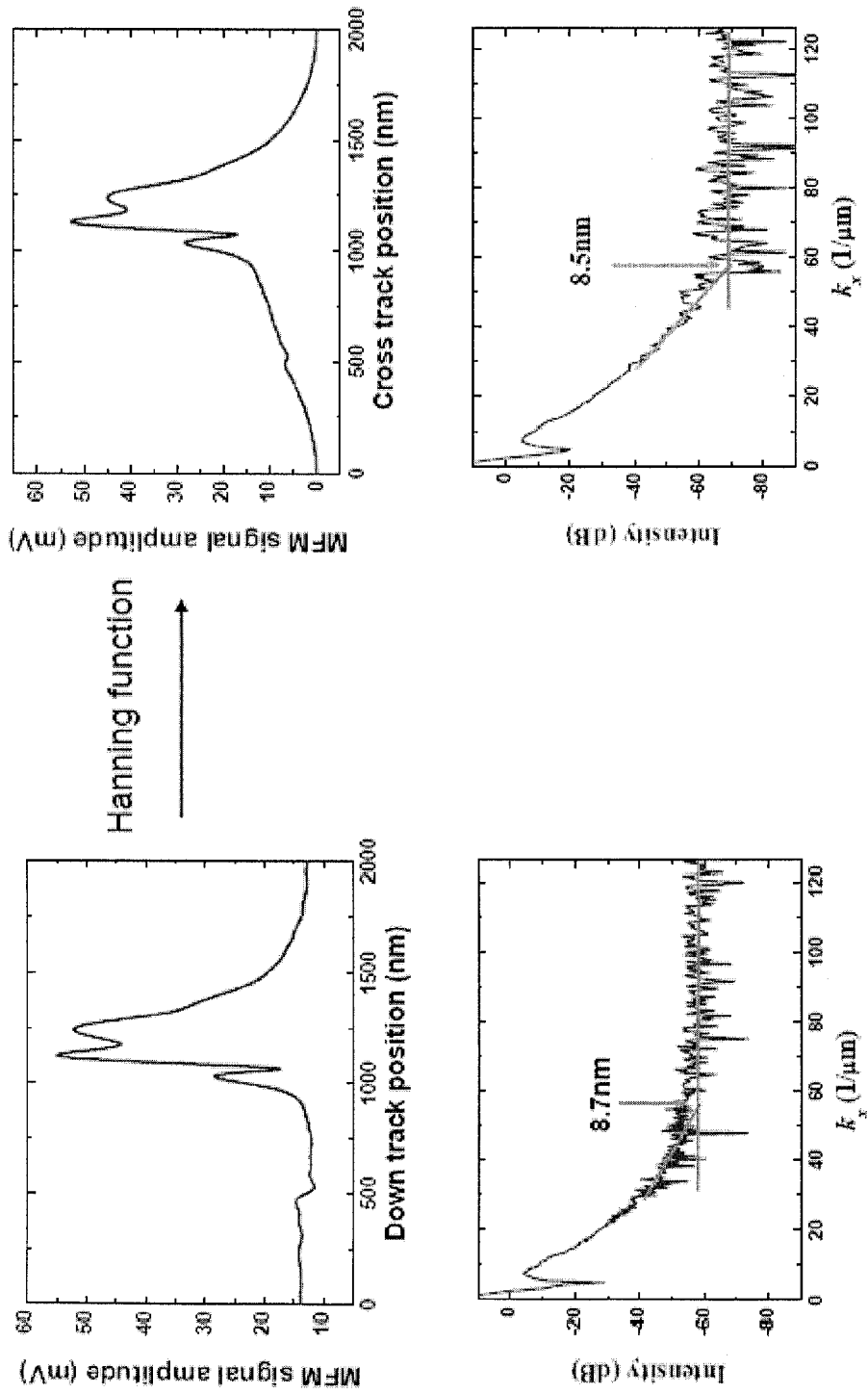
FIG. 17 is a set of plans showing spatial resolution performance.

FIG. 17 is a set of plans showing spatial resolution performance. Here, the head current is set to 20 mA and the probe-sample distance is set to 5 nm. The upper-left graph of FIG. 17 is a line profile in the down track direction including the main magnetic pole; and the lower-left graph of FIG. 17 is a spatial spectrum obtained by Fourier transform of the line profile. The horizontal axis indicates wave number (i.e. a number of wavelength included in a unit length, which is proportional to the inverse of the wavelength.); here, it is shown by number of wavelength included in 1 μm. The vertical axis indicates signal intensity shown by decibel ($20 \, Log_{10}X$). As seen from the figure, when the wave number increases, signal intensity decreases to be a constant value. The constant value corresponds to a white noise mainly including a thermodynamic noise of the probe. Here, the spatial resolution performance is defined as a half wavelength of minimum wavelength from an inverse of a wavelength (where the signal intensity and the noise intensity are equal) to ratio of signal/noise intensity, i.e.

1. The definition of the spatial resolution performance is the same as the one obtained from the image obtained by observing magnetic recording medium with the MFM; in this case, the spatial resolution performance corresponds to the length of magnetic bit of the observable recording density (the recording wavelength comprises two magnetic bits having different polarity from each other.). The estimated spatial resolution is 8.7 nm. This evaluation method does not cause any problem if an element such as recording bit of a magnetic recording medium (which periodically generates a magnetic field) is evaluated within the range of integral multiple of the wavelength. However, when the evaluated subject is an element, such as a magnetic head, which does not generate a magnetic field periodically, if signal levels are different at the right-and-left ends of horizontal axis of the line profile, Fourier transform is performed under a periodic boundary conditions (signals of both ends are connected). Therefore, high-frequency component which is not essential for making spectrum is mixed and noise does not converge on a constant level but gradually decrease at high-frequency region. Due to this, when spatial resolution is obtained from an intersection of signal and noise, the spatial resolution cannot be accurately obtained, which is problematic. On the other hand, to match the signal levels at the both ends of the line profile, when spatial resolution is measured within a wide range of the magnetic field intensity of both ends to be zero, space between the measurement points becomes wider, which also deteriorate the accuracy.

So as to solve these problems, by using Hanning window for the line profile of the upper-left graph and setting the values of both ends of the vertical axis to zero, the upper-right graph was obtained; the spatial spectrum is also shown in the lower-left graph. By using Hanning window, the noise level becomes constant; so, it is possible to accurately evaluate the spatial resolution. The obtained spatial resolution was 8.5 nm, which was substantially equivalent to the value before using Hanning window.

Figure 18:
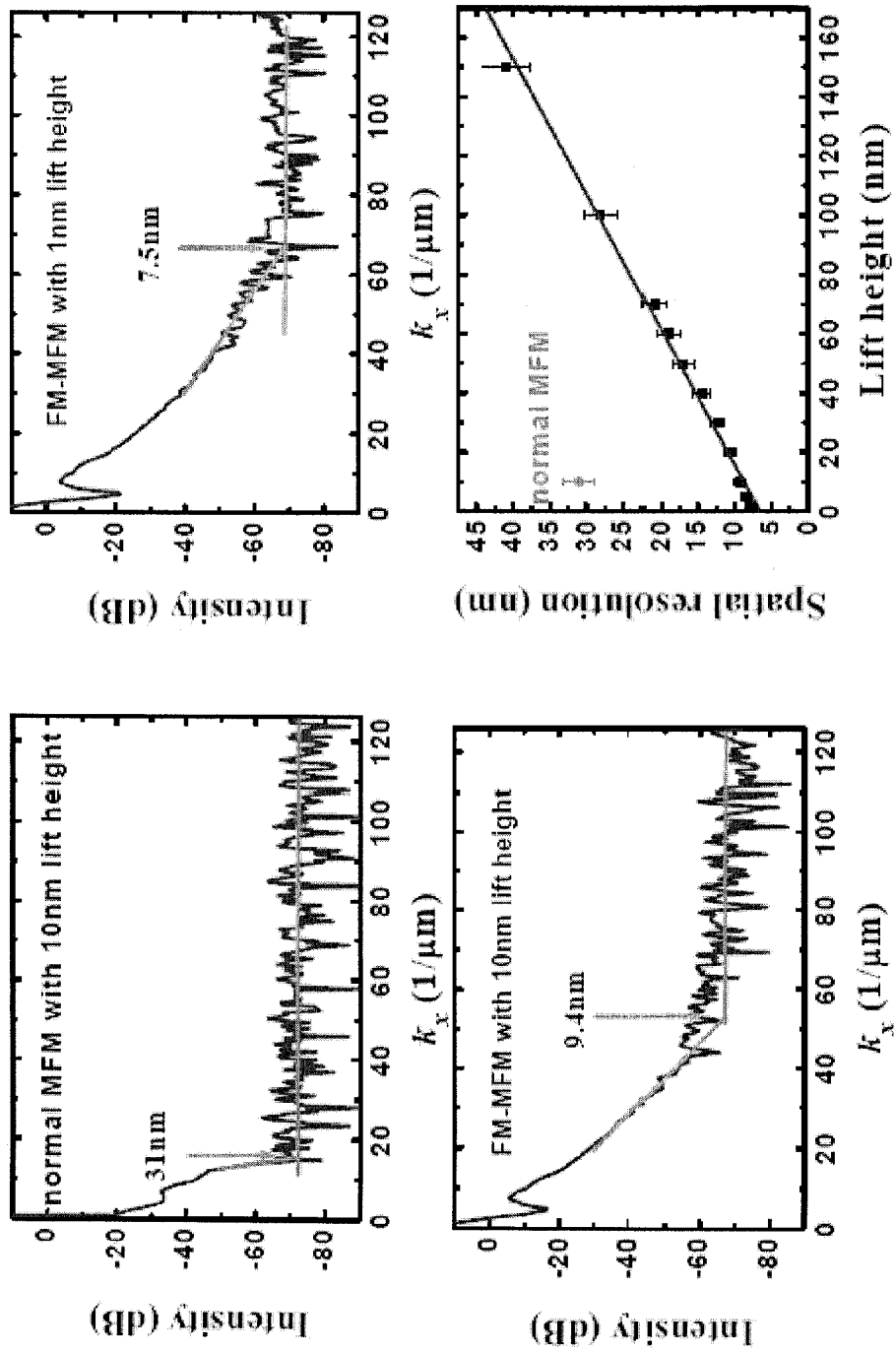
FIG. 18 is a set of plans showing dependence of the spatial resolution performance on the probe-sample distance, when the excitation current frequency of a single-pole-type head for perpendicular magnetic recording is 100 Hz.

FIG. 18 is a set of plans showing the spatial resolution performance in the air depending on the probe-sample distance. Here, by keeping the head current constant at 20 mA (effective value of an alternating current at a frequency of 100 Hz), as described in FIG. 17, spatial spectrum was obtained with Hanning window from a line profile in the down track direction including the main magnetic pole. The upper-left graph shows a spatial spectrum when observed by a conventional MFM with a head current of 20 mA (direct current) and a probe-sample distance of 10 nm; and the spatial resolution is about 30 nm. The lower-left graph shows a spatial spectrum when observed by a magnetic head element evaluation device of the present invention with a head current of 20 mA (alternating current, effective value) and a probe-sample distance of 10 nm; and the spatial resolution is just under 10 nm. The spatial resolution is equivalent to a value obtained, by using conventional MFM, when making the measurement atmosphere into a vacuum and setting the resonant performance factor Q of the probe to about 5000 which is one digit larger than that in the air. By using the magnetic head element evaluation device of the invention, it can be seen that it is possible to obtain spatial resolution which is equivalent to that measured in a vacuum in the air with high measurement sensitivity. Although a magnetic field at a proximity of the sample surface cannot be detected by the conventional MFM since the magnetic field is masked by a strong short-range force attributed to the surface, the magnetic field at a proximity of the sample surface can be measured by the magnetic head element evaluation device of the invention. The upper-right graph shows a spatial spectrum obtained when reducing the probe-sample distance down to 1 nm by using the magnetic head element evaluation device of the invention; according to the graph, it can be seen that a high spatial resolution just under 8 nm is obtained. The lower-right graph shows dependency of the spatial resolution on the probe-sample distance; the graph also show the value measured by the conventional MFM. Compared with conventional MFM, it is understood that the magnetic head element evaluation device of the present invention attains higher spatial resolution.

INDUSTRIAL APPLICABILITY

The surface state measuring device of the present invention exhibits excellent time resolution performance and spatial resolution performance, so it is possible to be used for evaluating magnetic field response of hard disk media showing hard magnetic property; it is also possible to be used for evaluating magnetic field response of high-frequency membrane trans, magnetic read/write head, and so on respectively showing soft magnetic property. Moreover, since the surface state measuring device can detect high-frequency magnetic field leaked from the wiring of semiconductor device with high resolution, it can be used for evaluating semiconductor devices.

The invention claimed is:

1. A surface state measuring device for measuring surface state of a sample by detecting modulation of the oscillations of the probe arranged over the sample, comprising:
   an excitation mechanism for exciting a cantilever having a probe;
   scanning mechanism for making the probe scan the sample by moving the probe and the sample relative to each other;
   an alternating force generator for generating an alternating force between the sample and the probe, by a signal having a single frequency not being resonance frequencies of the cantilever;
   a modulation measuring mechanism for measuring degree of periodic frequency modulation of the oscillation of the probe, which is caused by a periodic change of effective spring constant of the cantilever having the probe caused by attracting force and repulsive force which are periodically applied to the probe by the alternating force, by employing frequency demodulation, by amplitude demodulation, or by an intensity of a sideband spectrum among sideband spectrums generated by the frequency modulation.

2. The surface state measuring device according to claim 1, wherein the alternating force is an alternating magnetic field or an alternating electric field.

3. The surface state measuring device according to claim 1 or 2, wherein the alternating force is a force which excludes any frequencies of resonance frequencies of the cantilever having the probe.

4. The surface state measuring device according to claim 1 or 2, wherein
   the frequency of the alternating force is the one within a range where sideband intensity of the frequency modulation caused when applying an alternating force to the cantilever having the probe being excited near the resonance frequencies does not attenuate to the level of the noise of thermal vibration of the cantilever having the probe or less;
   the excitation mechanism is configured to excite the probe with a frequency near the resonance frequencies of the cantilever having the probe; and
   the modulation measuring mechanism is configured to measure degree of periodic frequency modulation of the oscillation of the cantilever having the probe by frequency demodulation or by an intensity of a sideband spectrum among sideband spectrums generated by the frequency modulation.

5. The surface state measuring device according to claim 1 or 2, wherein
   the frequency of the alternating force is the one having a range where sideband intensity of the frequency modulation caused when applying an alternating force to the cantilever having the probe being excited near the resonance frequencies does attenuate to the level of the noise of thermal vibration of the cantilever having the probe or less;
   the excitation mechanism is configured to excite the cantilever having the probe so that frequency of a sideband spectrum among sideband spectrums generated by the frequency modulation of the probe generated by an alternating force synchronizes with the resonance frequencies of the cantilever having the probe by adjusting the frequency to be different from the resonance frequencies;
   the modulation measuring mechanism is configured to measure degree of periodic frequency modulation of the oscillation of the probe generated by application of an alternating force to the probe, up to the upper limit frequency capable of mechanically exciting the cantilever having the probe, by frequency demodulation, by amplitude modulation, or by an intensity of a sideband spectrum synchronized with resonance frequencies of the cantilever of the probe.

6. A surface state measuring method for measuring surface state of a sample by detecting modulation of oscillation of a probe arranged over the sample, comprising the steps of:
   exciting a cantilever having a probe;
   making the probe scan the sample by moving the probe and the sample relative to each other;
   generating alternating force between the sample and the probe, by a signal having a single frequency not being resonance frequencies of the cantilever; and
   measuring degree of periodic frequency modulation of the oscillation of the probe, which is caused by a periodic change of effective spring constant of the cantilever having the probe caused by attracting force and repulsive force which are periodically applied to the probe by the alternating force, by employing frequency demodulation, by amplitude demodulation, or by an intensity of a sideband spectrum among sideband spectrums generated by the frequency modulation.

7. The surface state measuring method according to claim 6, wherein the alternating force is an alternating magnetic field or an alternating electric field.

8. The surface state measuring method according to claim 6 or 7, wherein the alternating force is a force which excludes any frequencies of resonance frequencies of the cantilever having the probe.

9. The surface state measuring method according to claim 6 or 7, wherein
   the frequency of the alternating force is the one having a range where sideband intensity of the frequency modulation caused when applying an alternating force to the cantilever having the probe being excited near the resonance frequencies does not attenuate to the level of the noise of thermal vibration of the cantilever having the probe or less;

the excitation is to excite the probe with a frequency near the resonance frequencies of the cantilever having the probe; and degree of periodic frequency modulation of the oscillation of the probe is measured by frequency demodulation or by an intensity of a sideband spectrum among sideband spectrums generated by the frequency modulation.

10. The surface state measuring method according to claim 6 or 7, wherein the frequency of the alternating force is the one having a range where sideband intensity of the frequency modulation caused when applying an alternating force to the cantilever having the probe being excited near the resonance frequencies does attenuate to the level of the noise of thermal vibration of the cantilever having the probe or less;

the excitation is to excite the cantilever having the probe so that frequency of a sideband spectrum among sideband spectrums generated by an frequency modulation of the probe generated by the alternating force synchronizes with the resonance frequencies of the cantilever having the probe by adjusting the frequency to be different from the resonance frequencies;

degree of periodic frequency modulation of the oscillation of the probe is measured by frequency demodulation, by an amplitude demodulation, or by an intensity of a sideband spectrum synchronized with the resonance frequencies of the cantilever having the probe.

\* \* \* \* \*